(12) United States Patent
Nishioka et al.

(10) Patent No.: US 7,649,991 B2
(45) Date of Patent: *Jan. 19, 2010

(54) METHOD OF A PUBLIC KEY ENCRYPTION AND A CYPHER COMMUNICATION BOTH SECURE AGAINST A CHOSEN-CIPHERTEXT ATTACK

(75) Inventors: Mototsugu Nishioka, Yokohama (JP); Yoichi Seto, Sagamihara (JP); Hisayoshi Satoh, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 517 days.

This patent is subject to a terminal disclaimer.

(21) Appl. No.: 11/634,863

(22) Filed: Dec. 7, 2006

(65) Prior Publication Data

US 2007/0177727 A1    Aug. 2, 2007

Related U.S. Application Data

(63) Continuation of application No. 10/059,339, filed on Jan. 31, 2002, now Pat. No. 7,164,765.

(30) Foreign Application Priority Data

Apr. 11, 2001 (JP) ............................. 2001-112161
Apr. 20, 2001 (JP) ............................. 2001-121969

(51) Int. Cl.
*H04L 9/30* (2006.01)

(52) U.S. Cl. ...................................... 380/30

(58) Field of Classification Search ....................... None
See application file for complete search history.

(56) References Cited

U.S. PATENT DOCUMENTS

| 6,081,598 A | 6/2000 | Dai |
| 6,108,783 A | 8/2000 | Krawczyk et al. |
| 2002/0046339 A1 | 4/2002 | Bellare et al. |

OTHER PUBLICATIONS

R. L. Rivest, et al., "A Method for Obtaining Digital Signatures and Public -Key Cryptosystems", Communication of the ACM, vol. 21, No. 2, pp. 120-126, 1978.
V. S. Miller, "Use of Elliptic Curves in Cryptography", Proc. Of Crypto '85, LNCS218, Springer-Verlag, pp. 417-426, 1985.
N. Koblitz, "Elliptic Curve Cryptosystems", Math. Comp., 48, 177, pp. 203-209, 1987.

(Continued)

*Primary Examiner*—Gilberto Barron, Jr.
*Assistant Examiner*—Abdulhakim Nobahar
(74) *Attorney, Agent, or Firm*—Brundidge & Stanger, P.C.

(57) ABSTRACT

The public-key encryption method uses the sender-side apparatus by the creator of a ciphertest and creates the ciphertext of a plaintext x ($\in \{0, 1\}^n$), in $y_1 = f(x0^{k_1} G(r))$, $y_2 = H(x0^{k_1} G(r)) r$ with respect to the published trapdoor-equipped unidirectional function f and the random functions G, H. Meanwhile, the receiver of the ciphertext, who has received the ciphertext by the receiver-side apparatus via the communications line, performs the decryption processing with the use of $f^{-1}$, i.e., the secret key, in accordance with the steps inverse to those of the encryption processing.

7 Claims, 17 Drawing Sheets

OTHER PUBLICATIONS

M. O. Rabin, Digital Signatures and Public -Key Encryptions as Intractable as Factorization, MIT, Technical Report, MIT/LCS/TR-212, 1979.

T. El Gamal, A Public Key Cryptosystem and a Signature Scheme Based on Discrete Logarithms, IEEE Trans. On Information Theory, IT=31, 4, pp. 469-472, 1985.

S. Goldwasser and S. Micali, Probailistic Encryption, JCSS, 28, 2, pp. 270-299, 1984.

M. Blum and S. Goldwasser, "An Efficient Probabilistic Public-Key Encryption Scheme which Hides All Partial Information", Proc. Of Crypto '84, LNCS196, Springer-Verlag, pp. 289-299.

S. Goldwasser and M. Bellaree, Lecture Notes on Cryptography, http://www.cse.ucsd.edu/users/mihir/, 1997.

T. Okamoto and S. Uchiyma, A New Public-Key Cryptosystem as Secure as Factoring, Proc. Of Eurocrypt '98, LNCS1403, Springer Veriag., pp. 308-318, 1998.

D. Dolev, et al., Non-Malleable Cryptography, In 23$^{rd}$ Annual ACM Symposium n Theory of Computing, pp. 542-552, 1991.

M. Naor and M. Yung, Public-Key Cryptosystems Provably Secure Against Chosen Cipertext Attacks, Proc. Of STOC, ACM Press, pp. 427-437, 1990.

R. Cramer and V. Shoup, "A Practical Public Key Cryptosystem Provably Secure Against Adaptive Chosen Ciphertext Attack," Proc. Of Crypto '98, LNCS1462, Springer-Verlag, pp. 13-25, 1998.

M. Bellare et al. Relations Among Notions of Security for Public-Key Encryption Schemes, Proc. Of Crypto '98, LNCS1462, Springer Verlag, pp. 26-45, 1998.

V. Shoup, OAEP Reconsidered, available on the e-print library (2000/060), Nov. 2000.

H. Cohen, Jacobi Symbol: Definition & amp: Algorithm, A Course in Computational Algebraic Number Theory, Graduate Texts in math, 138, Springer-Verlag, New York, pp. 27-31, 1993.

Menezes, Vanstone, Oorschot, "Handbook of Applied Cryptography", 1997, CRC Press LLC, pp. 6-10, 25-27, 63-69, 72-74, 89 and 90.

Victor Shoup, "OAEP Reconsidered", IBM Zurich Research Lab, Säumerstr. 4, 8803 Rüschlikon, Switzerland, pp. Sep. 2001.

Mihir Bellare et al., "Opticmal Assymetric Encryption—How to Encrypt with RSA", pp. 1-19, Nov. 1995.

A. J. Menezes et al., Definition & amp: Algorithm, Handbook of Applied Cryptography, CRC Press, pp. 73, 1996.

William Stallings, "Cryptography and Network Security, Principles and Practice", Prentice hall, Second Edition, pp. 155, 173-177 and Fig. 6.5, 1999.

FIG.8

| | PLAINTEXT-SPACE SIZE (BITS) | SECURITY (IND-CCA2) |
|---|---|---|
| ELLIPTIC CURVE CYPHER (160-BIT VERSION) | 160 | × |
| RSA (1024-BIT VERSION) | 1024 | × |
| OAEP + RSA (1024-BIT VERSION) | 768 | ○ |
| EMBODIMENT'S METHOD (1024-BIT VERSION) | 896 | ○ |
| EMBODIMENT'S METHOD (1536-BIT VERSION) | 1408 | ○ |

METHOD OF A PUBLIC KEY ENCRYPTION AND A CYPHER COMMUNICATION BOTH SECURE AGAINST A CHOSEN-CIPHERTEXT ATTACK

This is a continuation application of U.S. application Ser. No. 10/059,339, filed on Jan. 31, 2002, now U.S. Pat. No. 7,164,765.

BACKGROUND OF THE INVENTION

The present invention relates to a cipher communication method using a public-key encryption scheme and being provable to be semantically-secure against an adaptive chosen-ciphertext attack.

Up to the present, a variety of public-key encryption methods have been proposed. Among them, an encryption method published in a literature 1: "R. L. Rivest, A. Shamir, L. Adleman: A Method for Obtaining Digital Signatures and Public-Key Cryptosystems, Commun. of the ACM, Vol. 21, No. 2, pp. 120-126, (1978)" is the most famous and the most put-into-practical-use public-key encryption scheme. As another encryption method, a method using elliptic curves described in the following literatures has been known as an efficient public key encryption scheme: A literature 2: "V. S. Miller: Use of Elliptic Curves in Cryptography, Proc. of Crypto' 85, LNCS218, Springer-Verlag, pp. 417-426, (1985)", a literature 3: "N. Koblitz: Elliptic Curve Cryptosystems, Math. Comp., 48, 177, pp. 203-209, (1987)", and so on.

As encryption methods that are provable about the security, at first, as the methods with a chosen-plaintext attack set as their object, the following have been known: A method described in a literature 4: "M. O. Rabin: Digital Signatures and Public-Key Encryptions as Intractable as Factorization, MIT, Technical Report, MIT/LCS/TR-212 (1979)", a method described in a literature 5: "T. E L Gamel: A Public Key Cryptosystem and a Signature Scheme Based on Discrete Logarithms, IEEE, Trans. On Information Theory, IT-31, 4, pp. 469-472, (1985)", a method described in a literature 6: "S. Goldwasser and S. Micali: Probabilistic Encryption, JCSS, 28, 2, pp. 270-299, (1984)", a method described in a literature 7: "M. Blum and S. Goldwasser: An Efficient Probabilistic Public-Key Encryption Scheme which Hides All Partial Information, Proc. of Crypto' 84, LNCS196, Springer-Verlag, pp. 289-299, (1985)", a method described in a literature 8: "S. Goldwasser and M. Bellare: Lecture Notes on Cryptography, http:/www-cse.ucsd.edu/users/mihir/ (1997)", a method described in a literature 9: "T. Okamoto and S. Uchiyama: A New Public-Key Cryptosystem as Secure as Factoring, Proc. of Eurocrypto' 98, LNCS1403, Springer-Verlag, pp. 308-318, (1998)", and so on.

Also, as encryption methods that are provable about the security against the chosen-ciphertext attack, the following have been known: A method described in a literature 10: "D. Dolve, C. Dwork, and M. Naor: Non-Malleable Cryptography, In 23rd Annual ACM Symposium on Theory of Computing, pp. 542-552, (1991)", a method described in a literature 11: "M. Naor and M. Yung: Public-Key Cryptosystems Non-malleable against Chosen Ciphertext Attacks, Proc. of STOC, ACM Press, pp. 427-437, (1990)", a method described in a literature 12: "R. Cramer and V. Shoup: A Practical Public-Key Cryptosystem Non-malleable against Adaptive Chosen Ciphertext Attack, Proc. of Crypto' 98, LNCS1462, Springer-Verlag, pp. 13-25, (1998)", and so on.

Also, in a literature 13: "M. Bellare, A. Desai, D. Pointcheval, and P. Rogaway: Relations Among Notions of Security for Public-Key Encryption Schemes, Proc. of Crypto' 98, LNCS1462, Springer-Verlag, pp. 26-45, (1998)", the equivalence between IND-CCA2 (i.e., being semantically-secure against the adaptive chosen-ciphertext attack) and NM-CCA2 (i.e., being non-malleable against the adaptive chosen-ciphertext attack) has been demonstrated. Accordingly, at present, the public key encryption scheme satisfying this condition is considered as the most secure cypher.

An encryption method described in a literature 14: "M. Bellare and P. Rogaway: Optimal Asymmetric Encryption How to Encrypt with RSA, Proc. of Eurocrypto' 94, LNCS950, Springer-Verlag, pp. 92-111, (1994)" has been considered as semantically-secure against the adaptive chosen-ciphertext attack on the premise of the difficulty in calculating the inverse function of a one-way trapdoor permutation. In recent years, however, in a literature 15: "V. Shoup: OAEP Reconsidered. Available on the e-print library (2000/060), November 2000", a problem and the fact that the proof of the security is insufficient from a general viewpoint have been pointed out, and the solving methods therefor have been also proposed.

Meanwhile, in a cipher communication, in many cases, transmission data is encrypted using a common-key cypher, and the secret key to the common-key cypher used for the data encryption at that time is encrypted using a public key encryption scheme. One reason for this is that the length of a plaintext that can be encryption-processed at one time using the public-key encryption methods described in the above-described respective literatures is short, and is limited in proportion to the key length. For example, in the encryption method described in the literature 1, if the key length is 1024 bits, the plaintext is, at the most, 1024 bits. Moreover, in the encryption method described in the literature 3, if the base p is 160 bits, the information that can be transmitted at the one-time encryption is 160 bits.

In the practical systems, however, there are many cases where, in addition to the common key, the identification information (i.e., the ID information) of the user is also sent together therewith. Also, in accompaniment with the advancement of the computers' capabilities, the key length to be transmitted is now getting longer and longer. On account of this, there occurs a necessity for performing the encryption in a manner of being divided into a plurality of times. In the case of dividing the encryption into the plurality of times, there occurs a necessity for guaranteeing the validity of the correspondences among the respective ciphertexts. This necessitates much extra time and labor.

From the situation like this, expectations are concentrated on an encryption method which allows a longer plaintext to be encrypted at one time and whose security against the attack is provable.

Also, the literature 4 has proved that the encryption method described in the literature 4 is unidirectional against the chosen-plaintext attack. This, however, means that the encryption method is weak against the chosen-ciphertext attack. Also, although the encryption method in the literature 4 is superior in the high-speed performance in the encryption processing, the method could not be expected to implement a high-speed decryption processing.

SUMMARY OF THE INVENTION

It is an object of the present invention to provide an encryption method and a decryption method imposing only a small load on a calculation in encrypting transmission data and a calculation in decrypting encrypted data, allowing a high-speed processing to be implemented even in a limited calculation-capability information processing apparatus such as a portable-type information processing appliance, and using a public key, a key distribution method and a key sharing method using the public key, and further a program, an apparatus, or a system for executing these methods.

It is another object of the present invention to provide a method of constructing a public-key encryption method that is provable to be IND-CCA2 (i.e., semantically-secure against the adaptive chosen-ciphertext attack) on the premise of the difficulty in calculating the inverse function of a general one-way trapdoor permutation.

Furthermore, it is still another object of the present invention to provide, in the above-described public-key encryption method, a concrete public-key encryption method that is provable to be IND-CCA2 on the premise of the difficulty in the unique factorization problem into prime factors.

It is an even further object of the present invention to provide, on the basis of the encryption method described in the literature 4, an encryption method that is secure against the chosen-ciphertext attack and that permits the high-speed decryption processing to be implemented.

According to a 1st feature of the present invention, the present invention is carried out as follows, for example:

$f: \{0,1\}^k \to \{0,1\}^k$ one-way trapdoor permutation, $G: \{0,1\}^{k_0} \to \{0,1\}^{n+k_1}$ hash function, $H: \{0,1\}^{n+k_1} \to \{0,1\}^{k_0}$ hash function (1)

are defined as a public key, and $f^{-1}: \{0,1\}^k \to \{0,1\}^k$ Trapdoor function (2)

is defined as a secret key (where, $k=k_0+k_1+n$) A ciphertext sender-side apparatus, following the operation by the sender, selects a random number $r \in \{0,1\}^{k_0}$ for a plaintext $x$ ($x \in \{0,1\}^n$), and calculates $s = x0^{k_1} \oplus G(r), t = H(s) \oplus r,$ (3)

and further, defines $y_1 = f(s), y_2 = t,$ (4)

as the ciphertext, then transmitting the ciphertext to a receiver-side apparatus.

The expression $\{0,1\}^k$ represents the set of all bit sequence of length k. This means a bit string set having a length k is constituted by $0,1$, where $0^k$ represents a length k of all "$0$" (e.g., $0^5 = (0\ 0\ 0\ 0\ 0)$).

In accordance with the operation by the receiver, the ciphertext receiver-side apparatus, using the secret key of the receiver, calculates $s' = f^{-1}(y_1), t' = y_2$ (5)

and further, calculates $r' = H(s') \oplus t'$ (6)

and, based on $x' = \begin{cases} [s' \oplus G(r')]^n & \text{if } [s' \oplus G(r')]_{k_1} = 0^{k_1} \\ * & \text{otherwise} \end{cases}$ (7)

decrypts the ciphertext, thereby obtaining the plaintext (Here, it is stipulated that, in the case where the decryption result $x'=*$, the receiver-side apparatus denies the decryption of the ciphertext. Also, $[a]^n$ and $[a]_n$ designate the more-significant and the less-significant n bits of a, respectively).

The decryption result $x'=*$ for a ciphertext means that the correct decryption of the ciphertext has been unsuccessful. In this case, there exists a possibility that the ciphertext is a one intended for the attack. Accordingly, the receiver-side apparatus denies the decryption of the ciphertext in order to make the chosen-ciphertext attack impossible, thus never outputting the plaintext, i.e., the decryption result. At this time, the receiver-side apparatus may be formed into a configuration of outputting none of the decryption results, or may be formed into a configuration where the indication or a sound informs the receiver of the result that the decryption has been unsuccessful.

As one of the concrete methods,

[Key Generation]

a secret key (p, q) given by p, q: prime numbers, $p \equiv 3 (\mod 4), q \equiv 3 (\mod 4)$ (8)

is created, and further, a public key (N, k, G, H) given by $N = p^d q$ (d is odd number)

$k = |pq|$ $G: \{0,1\}^{k_0} \to \{0,1\}^{n+k_1}$ hash function, $H: \{0,1\}^{n+k_1} \to \{0,1\}^{k_0}$ hash function (9)

is created, and

[Encryption]

the ciphertext sender-side apparatus, following the operation by the sender, selects the random number $r \in \{0,1\}^{k_0}$ for the plaintext $x$ ($x \in \{0,1\}^n$), and calculates $s = x0^{k_1} \oplus G(r), t = H(s) \oplus r,$ (10)

(where, $n+k_0+k_1 \leq k-2$). Moreover, the sender-side apparatus defines $y_1 = s^{2N} \mod N, y_2 = t, y_3 = \left(\frac{s}{N}\right)$ (11)

as the ciphertext, then transmitting the ciphertext to the receiver (where, a=(m/N) designates a Jacobi symbol).

[Decryption]

Using the secret key (p, q) of the receiver, the receiver-side apparatus calculates, from the ciphertext, $x_{1,p} = y_1^{\frac{(p+1)q-1}{4}} \mod p,$ (12)

$x_{1,q} = y_1^{\frac{(q+1)p-d}{4}} \mod q$ and, of expressions, $\phi(x_{1,p}, x_{1,q})$, $\phi(-x_{1,p}, x_{1,q})$, $\phi(x_{1,p}, -x_{1,q})$, and $\phi(-x_{1,p}, -x_{1,q})$, the apparatus sets an expression satisfying $(x/N) = y_3$ and $0 > x > 2^{k-2}$ to be s' (where, $\phi$ designates a ring isomorphism mapping from Z/(p)×Z/(q) to Z/(pq) by the Chinese remainder theorem).

Moreover, the apparatus calculates $$r'=H(s')\oplus t' \qquad (13)$$

and, based on $$x' = \begin{cases} [s' \oplus G(r')]^n & \text{if } [s' \oplus G(r')]_{k_1} = 0^{k_1} \\ * & \text{otherwise} \end{cases} \qquad (14)$$

decryption-processes the ciphertext, thereby obtaining the plaintext (i.e., the message) (Here, it is stipulated that, in the case where x'=*, the receiver-side apparatus denies the decryption of the ciphertext, and informs the operator of a notice to the effect. Also, $[a]^n$ and $[a]_n$ designate the more-significant and the less-significant n bits of a, respectively).

Also, the present invention, in its one aspect, provides a public-key encryption method whose security against the attack is provable and which permits a plaintext space to be extended in size with a higher-efficiency as compared with the conventional public-key encryption methods (whose securities are provable). The method according to the present invention makes it possible to process even a long plaintext at the one-time encryption, thereby allowing the efficient processing to be implemented.

Also, the above-described plaintext becoming the target to be encrypted means all the digitized data including not only character strings but also images, sounds, and the like.

In the respective expressions in the present specification and the drawings, a symbol of a point "." or "+" surrounded by a circle designates an exclusive OR.

A 2nd feature of the present invention is as follows: In the encryption method described in the literature 4, the composite number N, i.e., the public key, has been selected as N=pq. In contrast to this, in the present invention, the composite number N is defined as $N=p^d q$ (d>1). This condition permits the high-speed decryption processing to be implemented.

Also, the encryption method described in the literature 14: "M. Bellare and P. Rogaway: Optimal Asymmetric Encryption How to Encrypt with RSA, Proc. of Eurocrypto' 94, LNCS950, Springer-Verlag, pp. 92-111, (1994)" and the literature 15: "V. Shoup: OAEP Reconsidered. Available on the e-print library (2000/060), November 2000" is a method that has been proposed on the premise that the method is utilized for the trapdoor-equipped one-way trapdoor permutation.

However, in the case where, just like the present invention, $x^2$ mod N (N is the composite number) is used as the encryption function, no one-way trapdoor permutation is implemented.

In the present invention, the combination with the encryption method in the literature 14 is employed while utilizing the hash functions for the encryption's uniqueness, thereby strengthening the security against the chosen-ciphertext attack.

Also, the present invention provides the encryption method and the decryption method imposing only a small load on the calculation in encrypting transmission data and the calculation in decrypting encrypted data, allowing the high-speed processing to be implemented even in the limited calculation-capability information processing apparatus such as a portable-type information processing appliance, and using the public key, the key distribution method and the key sharing method using the public key, and further the program, the apparatus, or the system for executing these methods.

According to one aspect of the present invention, the present invention is carried out as follows, for example:

As the steps of the key generation, (a) a secret key (p, q) given by an expression (146):

p, q: prime numbers $$p \equiv 3 \pmod{4}, q \equiv 3 \pmod{4} \qquad (146)$$

is created, and further, (b) a public key (N, k, G, H) given by an expression (147):

$N=p^d q$ (d is odd number)

$k=|N|$ $G:\{0,1\}^{k_0} \to \{0,1\}^{n+k_1}$ hash function, $$H:\{0,1\}^{n+k_1} \to \{0,1\}^{k_0} \text{ hash function} \qquad (147)$$

is created, and (I) the sender-side apparatus selects a random number $r \in \{0, 1\}^{k_0}$ for a plaintext x ($x \in \{0, 1\}^n$), and (c) calculates an expression (148):

$s=x0^{k_1} \oplus G(r)$, $$t=H(s) \oplus r, \qquad (148)$$

(where, $n+k_0+k_1=k$), and further, (d) calculates an expression (149):

$$w=s\|t, \qquad (149)$$

and (e) calculates an expression (150):

$$y=w^2 \bmod N \qquad (150)$$

and defines this result y as the ciphertext so as to transmit the ciphertext to the receiver-side apparatus, and (II) the receiver-side apparatus, using the secret key (p, q) of itself, (f) calculates, from the ciphertext y, an expression (151):

$$\alpha_0 = y^{\frac{p+1}{4}} \bmod p, \qquad (151)$$

$\beta_0 = \alpha_0,$ $\alpha_k = \frac{1}{2\beta_{k-1}} \left( \frac{y \bmod p^{k+1} - \beta_{k-1}^2}{p^k} \right) \bmod p, (k \geq 1)$ $\beta_k = \sum_{i=0}^{k} \alpha_i p^i \quad (k \geq 1),$ and, using this result, (g) calculates an expression (152):

$$x_p = \sum_{i=0}^{d-1} \alpha_i p^i \qquad (152)$$

and further, (h) calculates an expression (153):

$$x_q = y^{\frac{q+1}{4}} \bmod q \qquad (153)$$

and, concerning each of expressions, $\phi(x_p, x_q)$, $\phi(-x_p, x_q)$, $\phi(x_p, -x_q)$, and $\phi(-x_p, -x_q)$ (where, $\phi$ designates a ring isomorphism mapping from $Z/(p) \times Z/(q)$ to $Z/(pq)$ by the Chinese remainder theorem), (i) sets each of the expressions to be as given by an expression (154):

$$s'\|t'(s'\in\{0,1\}^{n+k_1}, t'\in\{0,1\}^{k_0}) \qquad (154)$$

and (j) calculates an expression (155):

$$r'=H(s')\oplus t',$$
$$x'\|z'=s'\oplus G(r') \ (x'\in\{0,1\}^n, z'\in\{0,1\}^{k_1}) \qquad (155)$$

and (k) obtains the decryption result given by an expression (156):

$$\begin{cases} x' & \text{if } z' = 0^{k_1} \\ * & \text{otherwise} \end{cases} \qquad (156)$$

(Here, it is stipulated that, in the case where the decryption result is *, the receiver-side apparatus denies the above-described ciphertext).

The decryption result is * for a ciphertext means that the correct decryption of the ciphertext has been unsuccessful. In this case, there exists a possibility that the ciphertext is a one intended for the attack. Accordingly, the receiver-side apparatus denies the decryption of the ciphertext in order to make the chosen-ciphertext attack impossible, thus never outputting the plaintext, i.e., the decryption result. At this time, the receiver-side apparatus may be formed into the configuration of outputting none of the decryption results, or may be formed into the configuration where the indication or a sound informs the receiver of the result that the decryption has been unsuccessful.

Also, the above-described plaintext becoming the target to be encrypted means all the digitized data including not only character strings but also images, sounds, and the like.

In the respective expressions in the present specification and the drawings, the symbol of a point or "+" surrounded by a circle designates an exclusive OR.

BRIEF DESCRIPTION OF THE DRAWINGS

FIG. 8 is a diagram for illustrating the comparison in the plaintext-space size and the security between the processing steps in the 2nd embodiment and the conventional methods (i.e., the elliptic curve cypher, RSA, and OAEP+RSA);

DETAILED DESCRIPTION OF THE EMBODIMENTS

Figure 1:
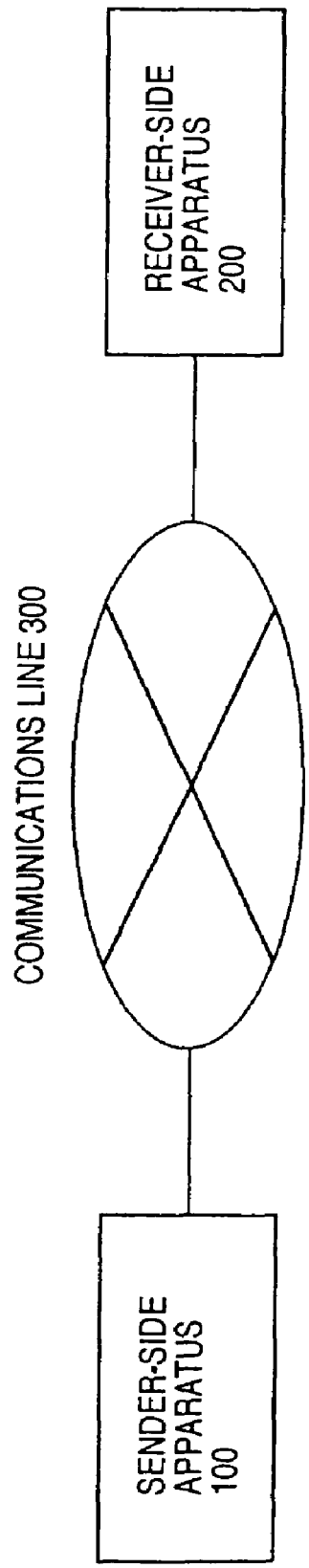
FIG. 1 is a diagram for illustrating the system configuration for executing a public-key encryption method and a cipher communication method according to the present invention.

Hereinafter, referring to the drawings, the explanation will be given below concerning the embodiments. FIG. 1 is a diagram for illustrating the system configuration in each embodiment. This system includes a sender-side apparatus 100 and a receiver-side apparatus 200. Moreover, the sender-side apparatus 100 and the receiver-side apparatus 200 are connected to each other via a communications line 300.

Figure 2:
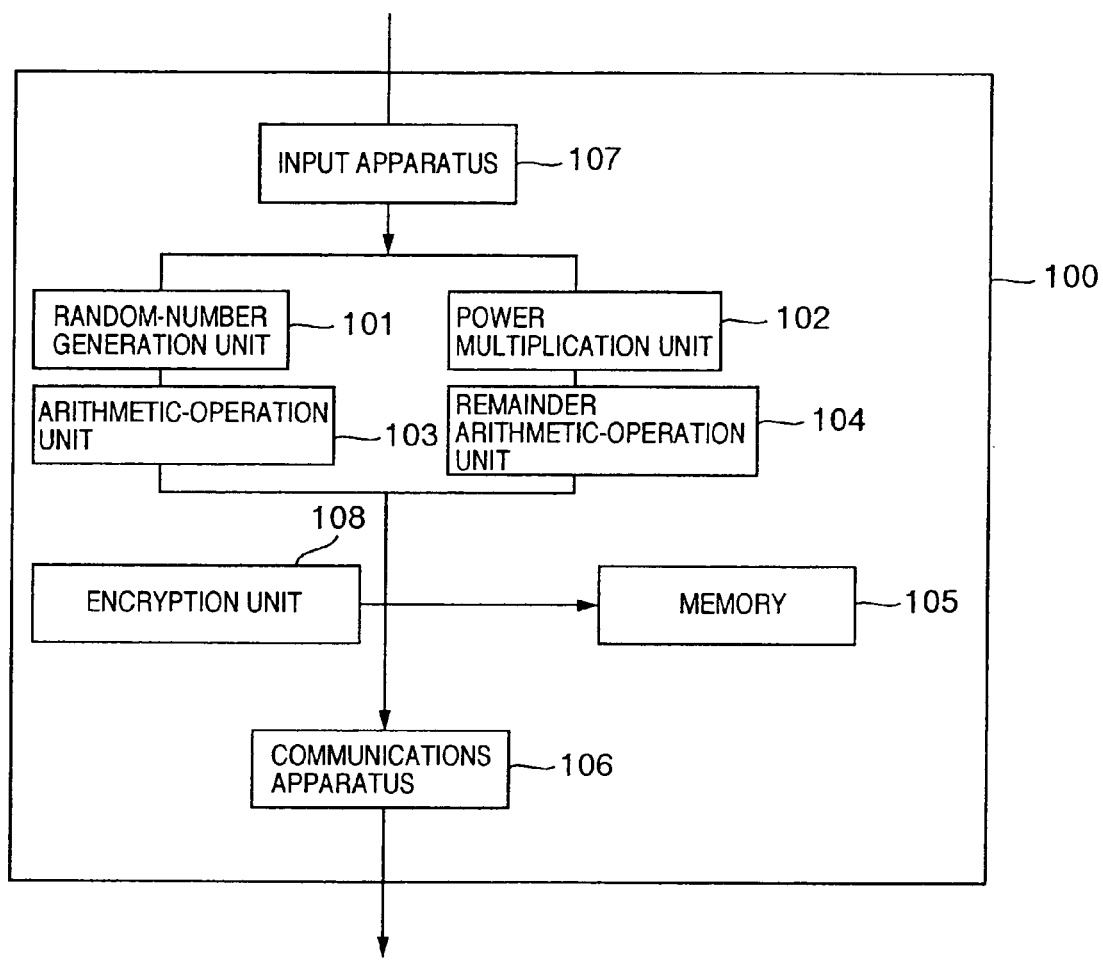
FIG. 2 is a diagram for illustrating the inner configuration of a sender-side apparatus.

FIG. 2 is a diagram for illustrating the inner configuration of the sender-side apparatus 100 in each embodiment. The sender-side apparatus 100 includes a random-number generation unit 101, a power multiplication unit 102, an arithmetic-operation unit 103, a remainder arithmetic-operation unit 104, a memory 105, a communications apparatus 106, an input apparatus 107, and an encryption unit 108.

Figure 3:
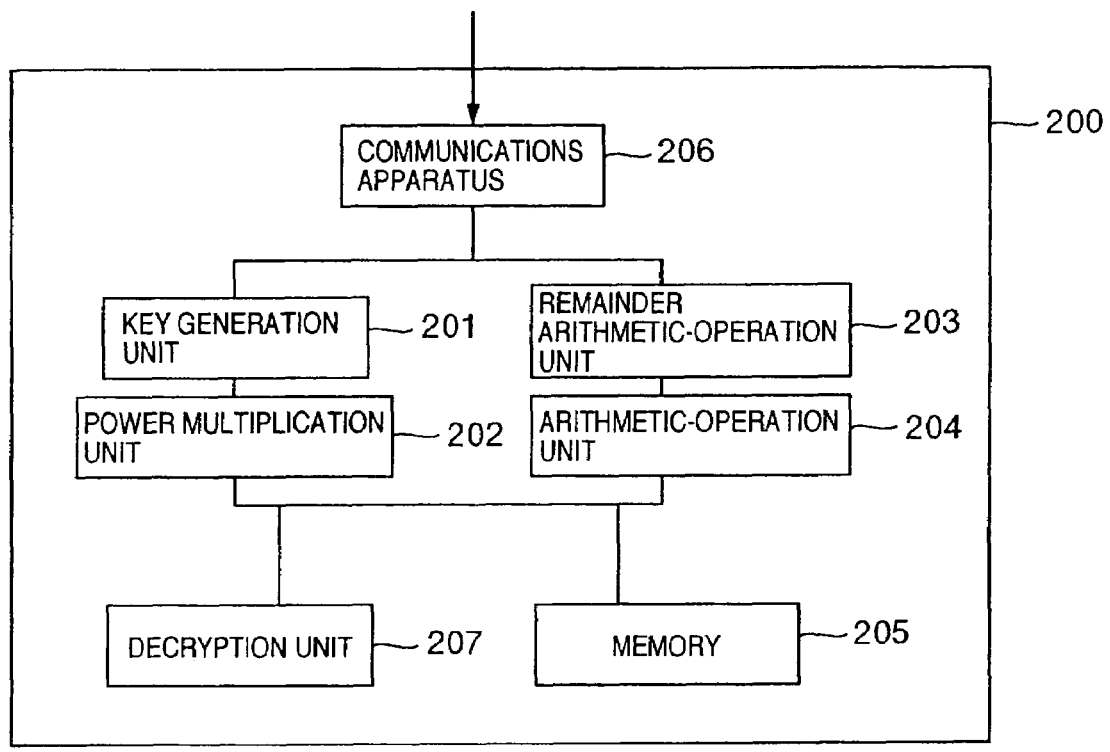
FIG. 3 is a diagram for illustrating the inner configuration of a receiver-side apparatus.

FIG. 3 is a diagram for illustrating the inner configuration of the receiver-side apparatus 200 in each embodiment. The receiver-side apparatus 200 includes a key generation unit 201, a power multiplication unit 202, a remainder arithmetic-operation unit 203, an arithmetic-operation unit 204, a memory 205, a communications apparatus 206, and a decryption unit 207.

The above-described sender-side apparatus or receiver-side apparatus can be embodied using a common computer including a CPU and a memory. Furthermore, the CPU executes, on the memory, programs stored in a fixed storage apparatus included in the above-described computer, thereby making it possible to embody the random-number generation unit 101, the power multiplication units 102, 202, the arithmetic-operation units 103, 204, the remainder arithmetic-operation units 104, 203, the encryption unit 108, the key generation unit 201, and the decryption unit 207. The respective programs may be stored into the fixed storage apparatus in advance, or may be installed into the fixed storage apparatus or the memory when required from an external storage apparatus such as a FD or a CD-ROM or from a network such as the Internet via an external interface.

1st Embodiment

In the present embodiment, the explanation will be given below concerning the case where, via a cipher communication, the sender of a plaintext (which is also referred to as "message") transmits, to the receiver, the message becoming the transmission data.

Figure 4:
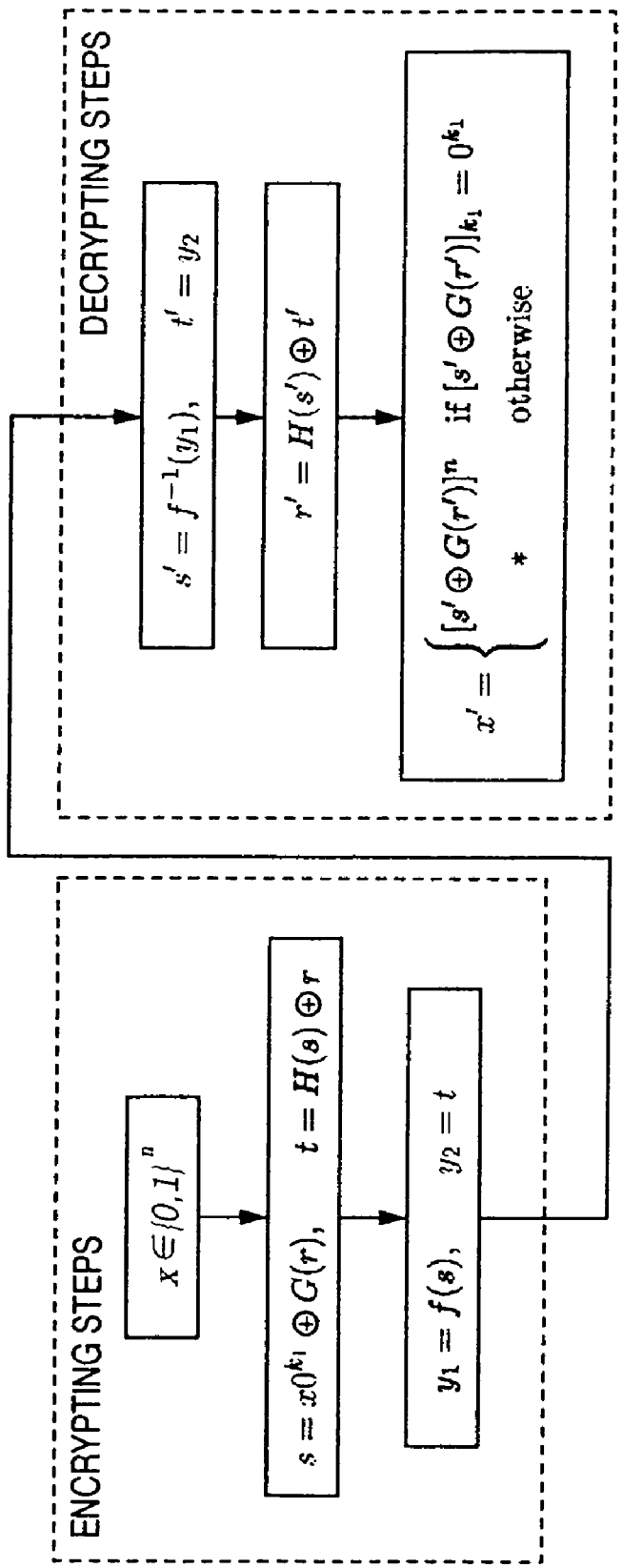
FIG. 4 is a diagram for illustrating the processing steps in a 1st embodiment.

FIG. 1 illustrates the system configuration in the present embodiment. Also, FIG. 4 is a diagram for illustrating the outline of the processing steps in the 1st embodiment.

1. Key Generation Processing

Using the key generation unit 201 in the receiver-side apparatus 200, the receiver creates, in advance, a public key given by $f:\{0,1\}^k \rightarrow \{0,1\}^k$ one-way trapdoor permutation, $G:\{0,1\}^{k_0} \rightarrow \{0,1\}^{n+k_1}$ hash function, $H:\{0,1\}^{n+k_1} \rightarrow \{0,1\}^{k_0}$ hash function  (1)

and a secret key given by $f^{-1}:\{0,1\}^k \rightarrow \{0,1\}^k$ Trapdoor function  (2)

(where, $k=k_0+k_1+n$). Also, the publication information is outputted via the communications line 300 or the like, then being sent to the sender-side apparatus 100 or being published. As the publishing method, a well-known method, e.g., the registration into a third party (i.e., a publication information management institution), is available. The other information is stored into the memory 205.

2. Encryption/Decryption Processing (1) Following the operation by the sender and using the random-number generation unit 101, the sender-side apparatus 100 selects a random number $r \in \{0, 1\}^{k_0}$ for a plaintext $x \in \{0, 1\}^n$ and, using the arithmetic-operation unit 103, the sender-side apparatus calculates $s = x0^{k_1} \oplus G(r), t = H(s) \oplus r,$  (3)

and further, calculates $y_1 = f(s), y_2 =$  (4)

Moreover, the sender-side apparatus defines $(y_1, y_2)$ as the ciphertext and, using the communications apparatus 106, transmits the ciphertext to the receiver-side apparatus 200 of the receiver via the communications line 300.

(2) Following the operation by the receiver and using the above-described secret information and the arithmetic-operation unit 204, the receiver-side apparatus 200 calculates, from the ciphertext $(y_1, y_2)$ $s' = f^{-1}(y_1), t' = y_2$  (5)

and further, calculates $r' = H(s') \oplus t'$  (6)

and, based on $$x' = \begin{cases} [s' \oplus G(r')]^n & \text{if } [s' \oplus G(r')]_{k_1} = 0^{k_1} \\ * & \text{otherwise} \end{cases}$$  (7)

decryption-processes the ciphertext, thereby obtaining the plaintext (i.e., the message) (Here, it is stipulated that, in the case where $x' = *$, the receiver-side apparatus 200 denies the decryption of the ciphertext, and informs the operator of a notice to the effect. Also, $[a]^n$ and $[a]_n$ designate the more-significant and the less-significant n bits of a, respectively).

The public-key encryption method according to the present embodiment can be proved to be semantically-secure against the chosen-ciphertext attack on the premise of the difficulty in determining the inverse function of the one-way trapdoor permutation f. The outline of the proof is as follows: If an enemy that is going to break the public-key encryption method according to the present embodiment (in the meaning of the semantical-security in the adaptive chosen-ciphertext attack, and the definition thereof has been described in, e.g., the literature 15) has an intentional purpose of obtaining information from a decryption oracle, the enemy is required to know the original plaintext in the ciphertext $(y_1, y_2)$ which is the question. Namely, it is impossible for the enemy to obtain the new information from the decryption oracle. Also, the use of a method similar to the one described in the literature 14 easily indicates that the method in the present embodiment is IND-CPA. This makes it possible to prove that the public-key encryption method in the present embodiment is IND-CCA2.

The method according to the present embodiment has succeeded in solving the problem in the literature 14 (i.e., the proof of the security is insufficient on the premise of the difficulty in calculating the inverse function of f) which has been pointed out in the literature 15.

Also, the method in the present embodiment permits the plaintext space to be extended in size with the security being maintained.

2nd Embodiment

Figure 5:
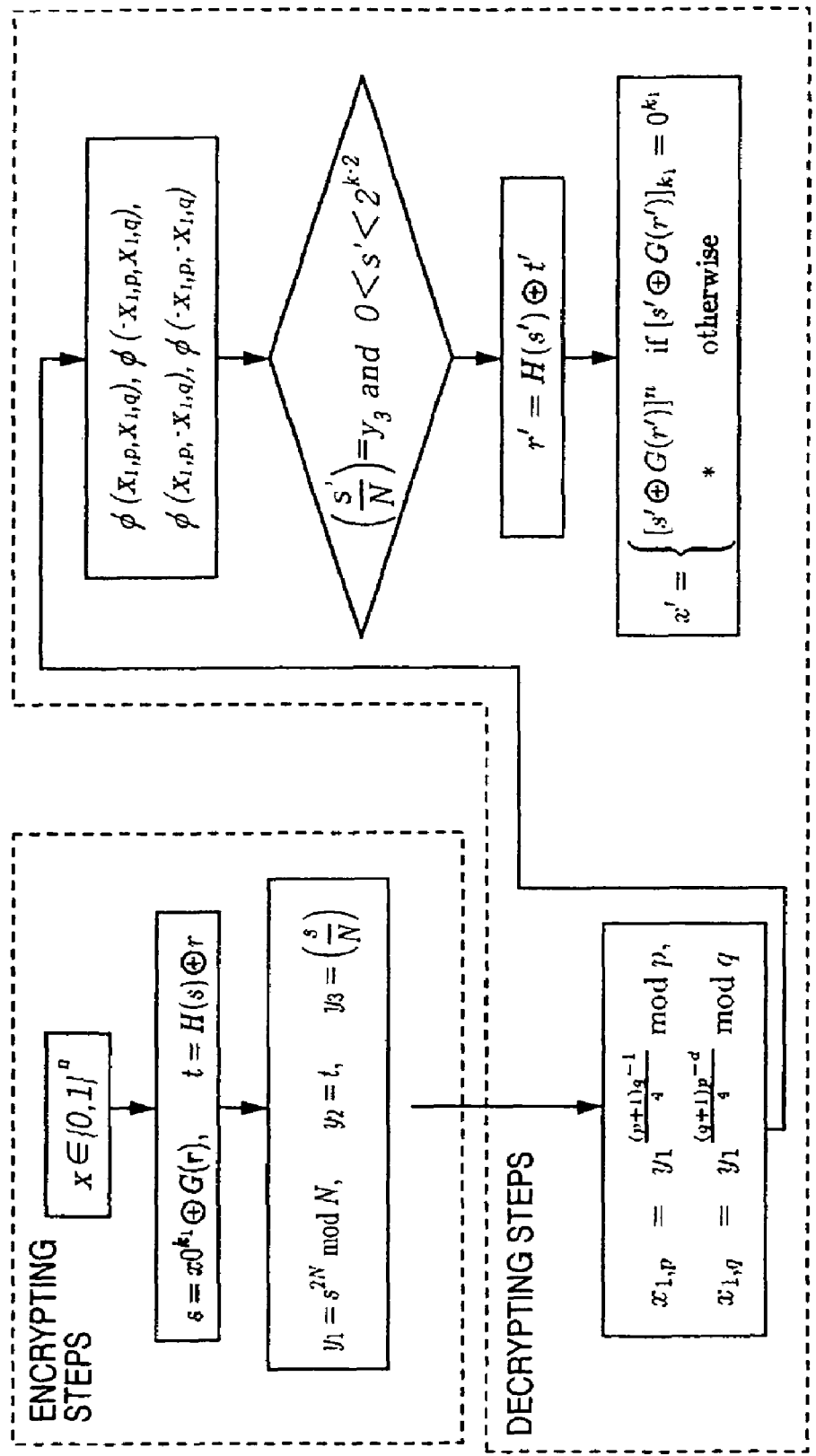
FIG. 5 is a diagram for illustrating the processing steps in a 2nd embodiment.

In the present embodiment, the more concrete explanation will be given below concerning the method according to the 1st embodiment. FIG. 5 is a diagram for illustrating the outline of the steps in the 2nd embodiment.

1. Key Generation Processing

Using the key generation unit 201 in the receiver-side apparatus 200, the receiver creates, in advance, a secret key (p, q) given by p, q: prime numbers, $p \equiv 3 \pmod 4, q \equiv 3 \pmod 4$  (8)

a public key (N, k, G, H) given by $N = p^d q$ (d is odd number)

$k = |pq|$ $G:\{0,1\}^{k_0} \rightarrow \{0,1\}^{n+k_1}$ hash function, $H:\{0,1\}^{n+k_1} \rightarrow \{0,1\}^{k_0}$ hash function  (9)

Here, it is stipulated that the manager or the receiver of the present system has determined the value of d in advance or as required, and that the above-described key generation unit fetches the value.

Also, the publication information is outputted via the communications line 300 or the like, then being sent to the sender-side apparatus 100 or being published. As the publishing method, the well-known method, e.g., the registration into the third party (i.e., the publication information management institution), is available. The other information is stored into the memory 205.

2. Encryption/Decryption Processing (1) Following the operation by the sender and using the random-number generation unit 101, the sender-side apparatus 100 selects a random number $r \in \{0, 1\}^{k0}$ for a plaintext $x \in \{0, 1\}^n$ and, using the arithmetic-operation unit 103, the power multiplication unit 102, and the remainder arithmetic-operation unit 104, the sender-side apparatus calculates $$s = x0^{k1} \oplus G(r), \quad t = H(s) \oplus r, \tag{10}$$

(where, $n+k_0+k_1 < k-2$), and further, calculates $$y_1 = s^{2N} \bmod N, \quad y_2 = t, \quad y_3 = \left(\frac{s}{N}\right) \tag{11}$$

(where, $a = (m/N)$ designates a Jacobi symbol).

The definition and the calculating method of the Jacobi symbol have been described in, e.g., a literature 16: "A. J. Menezes, P. C. van Oorschot, S. A. Vanstone: Jacobi Symbol: Definition & Algorithm, Handbook of Applied Cryptography, CRC Press, pp. 73, (1996)", or a literature 17: "H. Cohen: Jacobi Symbol: Definition & Algorithm, A Course in Computational Algebraic Number Theory, Graduate Texts in Math. 138, Springer-Verlag, New York, pp. 27-31, (1993)". Moreover, the sender-side apparatus defines ($y_1$, $y_2$, $y_3$) as the ciphertext and, using the communications apparatus 106, transmits the ciphertext to the receiver-side apparatus 200 of the receiver via the communications line 300.

(2) Following the operation by the receiver and using the above-described secret information (p, q) and the power multiplication unit 202, the remainder arithmetic-operation unit 203, and the arithmetic-operation unit 204, the receiver-side apparatus 200 calculates, from the ciphertext ($y_1$, $y_2$, $y_3$), $$x_{1,p} = y_1^{\frac{(p+1)q^{-1}}{4}} \bmod p, \tag{12}$$

$$x_{1,q} = y_1^{\frac{(q+1)p^{-d}}{4}} \bmod q$$

and, of expressions, $\phi(x_{1,p}, x_{1,q})$, $\phi(-x_{1,p}, x_{1,q})$, $\phi(x_{1,p}, -x_{1,q})$, and $\phi(-x_{1,p}, -x_{1,q})$, the apparatus sets an expression satisfying $(x/N) = y_3$ and $0 > x > 2^{k-2}$ to be s' (where, $\phi$ designates a ring isomorphism mapping from $Z/(p) \times Z/(q)$ to $Z/(pq)$ by the Chinese remainder theorem).

Moreover, the apparatus calculates $$r' = H(s') \oplus t' \tag{13}$$

and, based on $$x' = \begin{cases} [s' \oplus G(r')]^n & \text{if } [s' \oplus G(r')]_{k_1} = 0^{k_1} \\ * & \text{otherwise} \end{cases} \tag{14}$$

decrypts the ciphertext, thereby obtaining the plaintext (Here, it is stipulated that, in the case where x'=*, the receiver-side apparatus 200 denies the decryption of the ciphertext, and informs the operator of a notice to the effect. Also, $[a]^n$ and $[a]_n$ designate the more-significant and the less-significant n bits of a, respectively).

Also, the secret key (p, q) can also be created from prime numbers p', q', using p=2p'+1, q=2q'+1.

In the public-key encryption method in the present embodiment, the value of d ($d \geqq 1$) can be modified. For example, in the case where the bit length of the plaintext always remains short, the value of d is increased in a range where the unique factorization of n into its prime factors is difficult. This increase allows the decryption processing to be executed at a high-speed.

It can be demonstrated that, in the case of, e.g., d=3, the complete cryptanalysis of the method according to the present embodiment is impossible on the premise of the difficulty in the unique factorization problem of n. Namely, if there exists an algorithm for solving the unique factorization problem of n, the utilization of the algorithm makes it possible to configure an algorithm for executing the complete cryptanalysis of the method according to the present embodiment. Also, if there exists the algorithm for executing the complete cryptanalysis of the method according to the present embodiment, the utilization of the algorithm makes it possible to configure the algorithm for solving the unique factorization problem of n.

FIG. 8 is a diagram for illustrating the comparison in the plaintext-space size and the security between the method according to the 2nd embodiment and the conventional technologies (i.e., the elliptic curve cypher, RSA, and OAEP+ RSA) (where, $k_1 = k_0 = 128$). Making comparison between the method in the present embodiment and the conventional technologies indicates that the method permits the plaintext space to be further extended in size with the security being maintained.

3rd Embodiment

Figure 6:
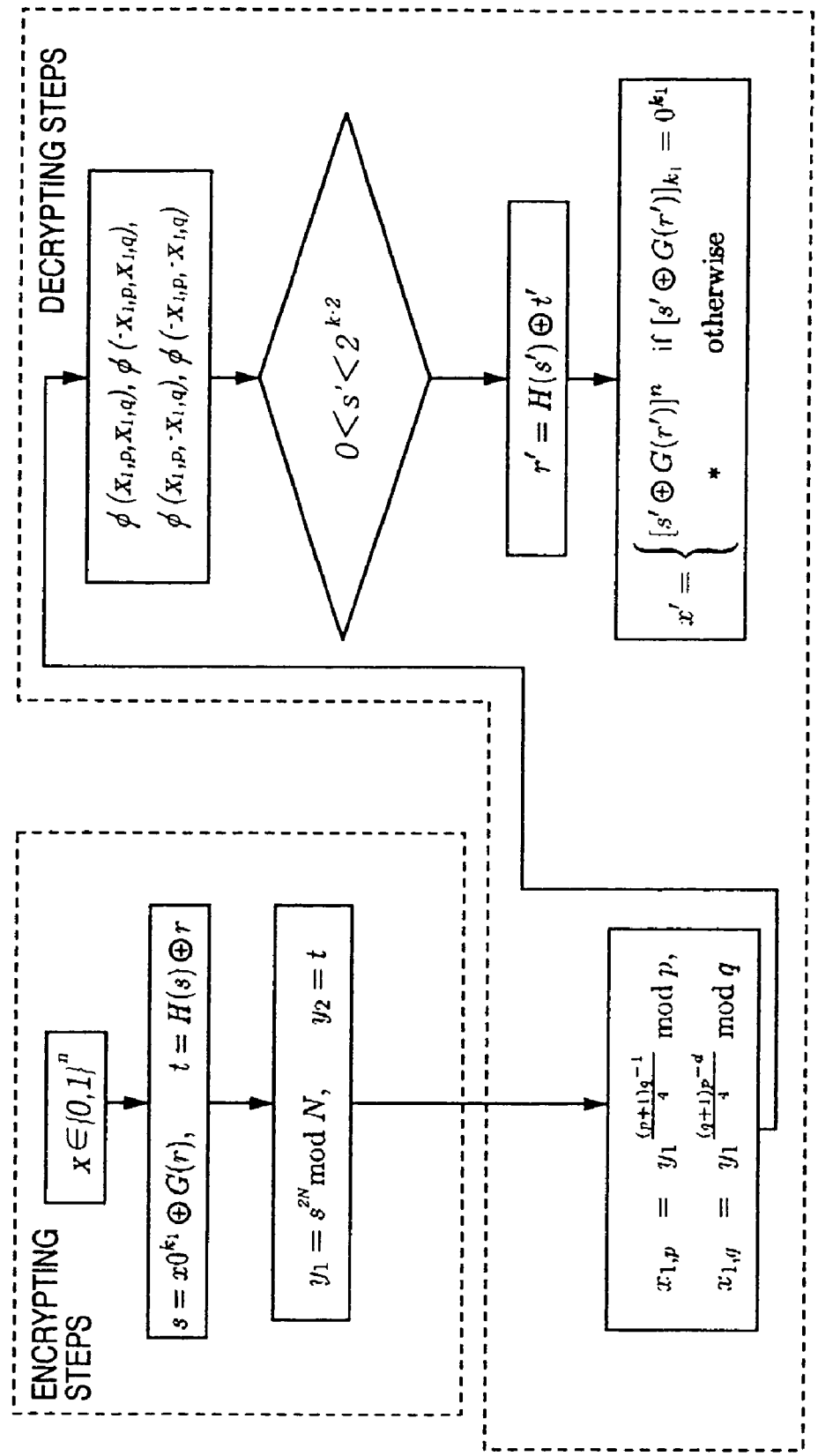
FIG. 6 is a diagram for illustrating the processing steps in a 3rd embodiment.

In the present embodiment, the explanation will be given below regarding a modified example of the 2nd embodiment. FIG. 6 is a diagram for illustrating the outline of the steps in the 3rd embodiment.

1. Key Generation Processing

Using the key generation unit 201 in the receiver-side apparatus 200, the receiver creates, in advance, a secret key (p, q) given by p, q: prime numbers, $$p \equiv 3 \pmod{4}, \quad q \equiv 3 \pmod{4} \tag{15}$$

a public key (N, k, G, H) given by $N = p^d q$ ($d \geqq 1$)

$k = |pq|$ $G: \{0,1\}^{k_0} \to \{0,1\}^{n+k_1}$ hash function, $H: \{0,1\}^{n+k_1} \to \{0,1\}^{k_0}$ hash function  (16)

Here, it is stipulated that the manager or the receiver of the present system has determined the value of d in advance, and that the above-described key generation unit can use the value. Also, the publication information is outputted via the communications line 300 or the like, then being sent to the sender-side apparatus 100 or being published. As the publishing method, the well-known method, e.g., the registration into the third party (i.e., the publication information management institution), is available. The other information is stored into the memory 205.

2. Encryption/Decryption Processing (1) Following the operation by the sender and using the random-number generation unit 101, the sender-side apparatus 100 selects a random number $r \in \{0, 1\}^{k0}$ for a plaintext $x \in \{0, 1\}^n$ and, using the arithmetic-operation unit 103, the power multiplication unit 102, and the remainder arithmetic-operation unit 104, the sender-side apparatus calculates $$s = x0^{k1} \oplus G(r), \quad t = H(s) \oplus r, \tag{17}$$

(where, $n+k_0+k_1 < k-2$), and further, calculates $$y_1 = s^2 \bmod N, \quad y_2 = t, \tag{18}$$

Moreover, the sender-side apparatus defines $(y_1, y_2)$ as the ciphertext and, using the communications apparatus 106, transmits the ciphertext to the receiver-side apparatus 200 of the receiver via the communications line 300.

(2) Following the operation by the receiver and using the above-described secret information $(p, q)$ and the power multiplication unit 202, the remainder arithmetic-operation unit 203, and the arithmetic-operation unit 204, the receiver-side apparatus 200 calculates, from the ciphertext $(y_1, y_2)$, $$x_{1,p} = y_1^{\frac{(p+1)q-1}{4}} \bmod p, \tag{19}$$

$$x_{1,q} = y_1^{\frac{(q+1)p-d}{4}} \bmod q$$

and, of expressions, $\phi(x_{1,p}, x_{1,q})$, $\phi(-x_{1,p}, x_{1,q})$, $\phi(x_{1,p}, -x_{1,q})$, and $\phi(-x_{1,p}, -x_{1,q})$, the apparatus sets an expression satisfying $0 > x > 2^{k-2}$ to be s' (Here, $\phi$ designates a ring isomorphism mapping from $Z/(p) \times Z/(q)$ to $Z/(pq)$ by the Chinese remainder theorem, and more than ones' may exist). Moreover, the apparatus calculates $$r' = H(s') \oplus t' \tag{20}$$

and, based on $$x' = \begin{cases} [s' \oplus G(r')]^n & \text{if } [s' \oplus G(r')]_{k_1} = 0^{k1} \\ * & \text{otherwise} \end{cases} \tag{21}$$

decrypts the ciphertext, thereby obtaining the plaintext (Here, it is stipulated that, in the case where $x' = *$, the receiver-side apparatus 200 denies the decryption of the ciphertext, and informs the operator of a notice to the effect. Also, $[a]^n$ and $[a]_n$ designate the more-significant and the less-significant n bits of a, respectively).

Also, the secret key $(p, q)$ can also be created from prime numbers p', q', using $p = 2p'+1$, $q = 2q'+1$.

In the public-key encryption method in the present embodiment, the value of d ($d \geq 1$) can be modified. For example, in the case where the bit length of the plaintext always remains short, the value of d is increased in a range where the unique factorization of n into its prime factors is difficult. This increase allows the decryption processing to be executed at a high-speed.

It can be demonstrated that, in the case of, e.g., d=3, the complete cryptanalysis of the method according to the present embodiment is impossible on the premise of the difficulty in the unique factorization problem of n. Namely, if there exists an algorithm for solving the unique factorization problem of n, the utilization of the algorithm makes it possible to configure an algorithm for executing the complete cryptanalysis of the method according to the present embodiment. Also, if there exists the algorithm for executing the complete cryptanalysis of the method according to the present embodiment, the utilization of the algorithm makes it possible to configure the algorithm for solving the unique factorization problem of n.

4th Embodiment

Figure 7:
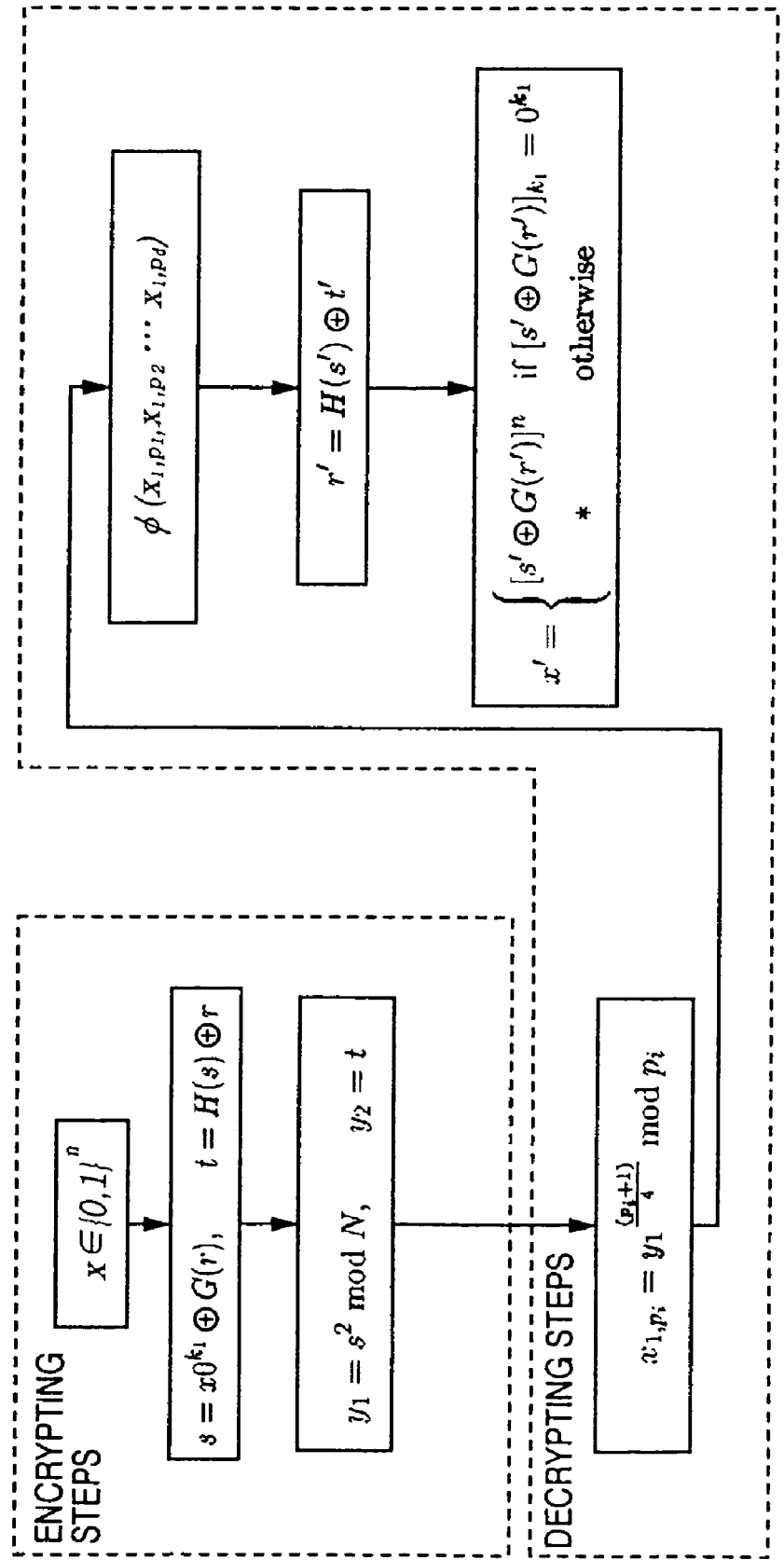
FIG. 7 is a diagram for illustrating the processing steps in a 4th embodiment.

In the present embodiment, the explanation will be given below regarding another modified example of the 2nd embodiment. FIG. 7 is a diagram for illustrating the outline of the steps in the 4th embodiment.

1. Key Generation Processing

Using the key generation unit 201 in the receiver-side apparatus 200, the receiver creates, in advance, a secret key $p_i$ ($1 \leq i \leq d$) given by $p_i$: prime numbers $$p_i \equiv 3 \pmod{4} \quad (1 \leq i \leq d, \ d > 1) \tag{22}$$

and a public key (N, k, G, H) given by $$N = \Pi_{i=1}^{d} p_i$$

$$k = |pq|$$

$$G: \{0,1\}^{k0} \rightarrow \{0,1\}^{n+k1} \text{ hash function,}$$

$$H: \{0,1\}^{n+k1} \rightarrow \{0,1\}^{k0} \text{ hash function} \tag{23}$$

Here, it is stipulated that the manager or the receiver of the present system has determined the value of d in advance, and that the above-described key generation unit can use the value. Also, the publication information is outputted via the communications line 300 or the like, then being sent to the sender-side apparatus 100 or being published. As the publishing method, the well-known method, e.g., the registration into the third party (i.e., the publication information management institution), is available. The other information is stored into the memory 205.

2. Encryption/Decryption Processing (1) Following the operation by the sender and using the random-number generation unit 101, the sender-side apparatus 100 selects a random number $r \in \{0, 1\}^{k0}$ for a plaintext $x \in \{0, 1\}^n$ and, using the arithmetic-operation unit 103, the power multiplication unit 102, and the remainder arithmetic-operation unit 104, the sender-side apparatus calculates $$s = x0^{k1} \oplus G(r), \quad t = H(s) \oplus r, \tag{24}$$

(where, $n+k_0+k_1 \leq \log_2(N+1)$), and further, calculates $$y_1 = s^2 \bmod N, \quad y_2 = t, \tag{25}$$

Moreover, the sender-side apparatus defines $(y_1, y_2)$ as the ciphertext and, using the communications apparatus 106, transmits the ciphertext to the receiver-side apparatus 200 of the receiver via the communications line 300.

(2) Following the operation by the receiver and using the above-described secret information $(p, q)$ and the power multiplication unit 202, the remainder arithmetic-operation unit 203, and the arithmetic-operation unit 204, the receiver-side apparatus 200 calculates, from the ciphertext $(y_1, y_2)$ $$x_{1,p_i} = y_1^{\frac{(p_i+1)}{4}} \mod p_i \quad (1 \leq i \leq d) \tag{26}$$

and, of $2^d$ expressions, $\phi(\pm x_{1,p1}, \pm x_{1,p2}, \ldots, \pm x_{1,pd})$, the apparatus sets an expression satisfying $0<s'<N/2$ to be s' (Here, $\phi$ designates a ring isomorphism mapping from $Z/(p_1) \times Z/(p_2) \times \ldots \times Z/(p_d)$ to $Z/(N)$ by the Chinese remainder theorem, and more than one s' may exist). Moreover, the apparatus calculates $$r'=H(s')\oplus t' \tag{27}$$

and, based on $$x' = \begin{cases} [s' \oplus G(r')]^n & \text{if } [s' \oplus G(r')]_{k_1} = 0^{k_1} \\ * & \text{otherwise} \end{cases} \tag{28}$$

decrypts the ciphertext, thereby obtaining the plaintext (Here, it is stipulated that, in the case where x'=, the receiver-side apparatus 200 denies the decryption of the ciphertext, and informs the operator of a notice to the effect. Also, $[a]^n$ and $[a]_n$ designate the more-significant and the less-significant n bits of a, respectively).

Also, the secret key p, q can also be created from prime numbers p', q', using p=2p'+1, q=2q'+1.

In the public-key encryption method in the present embodiment, the value of d (d>1) can be modified.

It can be demonstrated that the complete cryptanalysis of the method according to the present embodiment is impossible on the premise of the difficulty in the unique factorization problem of n. Namely, if there exists an algorithm for solving the unique factorization problem of n, the utilization of the algorithm makes it possible to configure an algorithm for executing the complete cryptanalysis of the method according to the present embodiment. Also, if there exists the algorithm for executing the complete cryptanalysis of the method according to the present embodiment, the utilization of the algorithm makes it possible to configure the algorithm for solving the unique factorization problem of n.

5th Embodiment

In the present embodiment, the explanation will be given below concerning a cipher communication method where the public-key encryption method according to the 1st embodiment is used for the key distribution.

FIG. 1 illustrates the system configuration in the present embodiment.

1. Key Generation Processing

Using the key generation unit 201 in the receiver-side apparatus 200, the receiver creates, in advance, the public key given by $f:\{0,1\}^k \to \{0,1\}^k$ one-way trapdoor permutation, $G:\{0,1\}^{k_0} \to \{0,1\}^{n+k_1}$ hash function, $H:\{0,1\}^{n+k_1} \to \{0,1\}^{k_0}$ hash function $\tag{29}$ and the secret key given by $f^{-1}: \{0,1\}^k \to \{0,1\}^k$ trapdoor function $\tag{30}$ (where, $k=k_0+k_1+n$). Also, the publication information is outputted via the communications line 300 or the like, then being sent to the sender-side apparatus 100 or being published. As the publishing method, the well-known method, e.g., the registration into the third party (i.e., the publication information management institution), is available. The other information is stored into the memory 205.

2. Encryption/Decryption Processing (1) Following the operation by the sender and using a data encryption key $K\in\{0,1\}^n$, the encryption unit 108 in the sender-side apparatus 100 encrypts, by an existing encryption method, a message m becoming the transmission data, thereby creating a ciphertext C. In addition, using the random-number generation unit 101, the sender-side apparatus selects the random number $r\in\{0,1\}^{k_0}$ and, using the arithmetic-operation unit 103, calculates $$s=K0^{k_1}\oplus G(r), t=H(s)\oplus r, \tag{31}$$

and further, calculates $$y_1=f(s), y_2=t, \tag{32}$$

Moreover, the sender-side apparatus, using the communications apparatus 106, transmits $(y_1, y_2)$ together with the ciphertext C to the receiver-side apparatus 200 of the receiver via the communications line 300.

(2) Following the operation by the receiver and using the above-described secret information and the arithmetic-operation unit 204 in the receiver-side apparatus 200, the receiver-side apparatus 200 calculates, from $(y_1, y_2)$ $$s'=f^{-1}(y_1) \; t'=y_2 \tag{33}$$

and further, calculates $$r'=H(s')\oplus t' \tag{34}$$

and, based on $$K' = \begin{cases} [s' \oplus G(r')]^n & \text{if } [s' \oplus G(r')]_{k_1} = 0^{k_1} \\ * & \text{otherwise} \end{cases} \tag{35}$$

calculates K' (Here, it is stipulated that, in the case where K'=*, the receiver-side apparatus 200 denies the decryption of the ciphertext, and informs the operator of a notice to the effect. Also, $[a]^n$ and $[a]_n$ designate the more-significant and the less-significant n bits of a, respectively).

Furthermore, the decryption unit 207 in the receiver-side apparatus 200, using K', performs the decryption of the ciphertext C, thereby obtaining the plaintext m.

6th Embodiment

In the present embodiment, the explanation will be given below concerning a cipher communication method where the public-key encryption method according to the 2nd embodiment is used for the key distribution.

1. Key Generation Processing

Using the key generation unit 201 in the receiver-side apparatus 200, the receiver creates, in advance, the secret key (p, q) given by p, q: prime numbers $p \equiv 3 \pmod 4, q \equiv 3 \pmod 4$ $\tag{36}$ and the public key (N, k, G, H) given by $N=p^d q$ (d is odd number)

$k=|pq|$ $G:\{0,1\}^{k_0} \to \{0,1\}^{n+k_1}$ hash function, $H:\{0,1\}^{n+k_1} \to \{0,1\}^{k_0}$ hash function  (37)

Also, the publication information is outputted via the communications line 300 or the like, then being sent to the sender-side apparatus 100 or being published. As the publishing method, the well-known method, e.g., the registration into the third party (i.e., the publication information management institution), is available. The other information is stored into the memory 205.

2. Encryption/Decryption Processing (1) Following the operation by the sender and using a data encryption key $K \in \{0, 1\}^n$ the encryption unit 108 in the sender-side apparatus 100 encrypts, by an existing encryption method, a message m becoming the transmission data, thereby creating a ciphertext C. In addition, using the random-number generation unit 101, the sender-side apparatus selects the random number $r \in \{0, 1\}^{k_0}$ and, using the arithmetic-operation unit 103, the power multiplication unit 102, and the remainder arithmetic-operation unit 104, the sender-side apparatus calculates $s = K 0^{k_1} \oplus G(r), t = H(s)r,$  (38)

(where, $n+k_0+k_1 < k-2$), and further, calculates $$y_1 = s^{2N} \bmod N, \quad y_2 = t, \quad y_3 = \left(\frac{s}{N}\right)$$  (39)

(where, a (m/N) designates the Jacobi symbol). Moreover, the sender-side apparatus, using the communications apparatus 106, transmits $(y_1, y_2, y_3)$ together with the ciphertext C to the receiver-side apparatus 200 of the receiver via the communications line 300.

(2) Following the operation by the receiver and using the above-described secret information (p, q) and the power multiplication unit 202, the remainder arithmetic-operation unit 203, and the arithmetic-operation unit 204, the receiver-side apparatus 200 calculates, from $(y_1, y_2, y_3)$ $$x_{1,p} = y_1^{\frac{(p+1)q-1}{4}} \bmod p,$$  (40)

$$x_{1,q} = y_1^{\frac{(q+1)p^{-d}}{4}} \bmod q$$

and, of expressions $\phi(x_{1,p}, x_{1,q}), \phi(-x_{1,p}, x_{1,q}), \phi(x_{1,p}, -x_{1,q})$, and $\phi(-x_{1,p}, -x_{1,q})$ the apparatus sets an expression satisfying $(x/N) = y_3$ and $0 < x < 2^{k-2}$ to be s' (where, $\phi$ designates the ring isomorphism mapping from $Z/(p) \times Z/(q)$ to $Z/(pq)$ by the Chinese remainder theorem). Moreover, the apparatus calculates $r' = H(s') \oplus t'$  (41)

and, based on $$K' = \begin{cases} [s' \oplus G(r')]^n & \text{if } [s' \oplus G(r')]_{k_1} = 0^{k_1} \\ * & \text{otherwise} \end{cases}$$  (42)

calculates K' (Here, it is stipulated that, in the case where K'=*, the receiver-side apparatus 200 denies the decryption of the ciphertext, and informs the operator of a notice to the effect. Also, $[a]^n$ and $[a]_n$ designate the more-significant and the less-significant n bits of a, respectively).

Furthermore, the decryption unit 207 in the receiver-side apparatus 200, using K', performs the decryption of the ciphertext C, thereby obtaining the plaintext m.

7th Embodiment

In the present embodiment, the explanation will be given below regarding a cipher communication method where the public-key encryption method according to the 3rd embodiment is used for the key distribution.

1. Key Generation Processing

Using the key generation unit 201 in the receiver-side apparatus 200, the receiver creates, in advance, the secret key (p, q) given by p, q: prime numbers, $p \equiv 3 \pmod 4, q \equiv 3 \pmod 4$  (43)

a public key (N, k, G, H) given by $N = p^d q \ (d \geq 1)$ $k = |pq|$ $G:\{0,1\}^{k_0} \to \{0,1\}^{n+k_1}$ hash function, $H:\{0,1\}^{n+k_1} \to \{0,1\}^{k_0}$ hash function  (44)

Also, the publication information is outputted via the communications line 300 or the like, then being sent to the sender-side apparatus 100 or being published. As the publishing method, the well-known method, e.g., the registration into the third party (i.e., the publication information management institution), is available. The other information is stored into the memory 205.

2. Encryption/Decryption Processing (1) Following the operation by the sender and using a data encryption key $K \in \{0, 1\}^n$, the encryption unit 108 in the sender-side apparatus 100 encrypts, by an existing encryption method, a message m becoming the transmission data, thereby creating a ciphertext C. In addition, using the random-number generation unit 101, the sender-side apparatus selects the random number $r \in \{0, 1\}^{k_0}$ and, using the arithmetic-operation unit 103, the power multiplication unit 102, and the remainder arithmetic-operation unit 104, the sender-side apparatus calculates $s = x 0^{k_1} \oplus G(r), t = H(s) \oplus r,$  (45)

(where, $n+k_0+k_1 < k-2$), and further, calculates $y_1 = s^{2N} \bmod N, y_2 = t,$  (46)

Moreover, the sender-side apparatus, using the communications apparatus 106, transmits $(y_1, y_2)$ together with the ciphertext C to the receiver-side apparatus 200 of the receiver via the communications line 300.

(2) Following the operation by the receiver and using the above-described secret information (p, q) and the power multiplication unit 202, the remainder arithmetic-operation unit 203, and the arithmetic-operation unit 204, the receiver-side apparatus 200 calculates, from $(y_1, y_2)$, $$x_{1,p} = y_1^{\frac{(p+1)q-1}{4}} \mod p, \quad (47)$$

$$x_{1,q} = y_1^{\frac{(q+1)p-d}{4}} \mod q$$

and, of expressions $\phi(x_{1,p}, x_1)$, $\phi(-x_{1,p}, x_{1,q})$, $\phi(x_{1,p}, -x_{1,q})$, and $\phi(-x_{1,p}, -x_{1,q})$, the apparatus sets an expression satisfying $0 < x < 2^{k-2}$ to be s' (where, $\phi$ designates the ring isomorphism mapping from $Z/(p) \times Z/(q)$ to $Z/(pq)$ by the Chinese remainder theorem, and more than one s' may exist). Moreover, the apparatus calculates $$r' = H(s') \oplus t' \quad (48)$$

and, based on $$K' = \begin{cases} [s' \oplus G(r')]^n & \text{if } [s' \oplus G(r')]_{k_1} = 0^{k_1} \\ * & \text{otherwise} \end{cases} \quad (49)$$

calculates K' (Here, it is stipulated that, in the case where K'=*, the receiver-side apparatus 200 denies the decryption of the ciphertext, and informs the operator of a notice to the effect. Also, $[a]^n$ and $[a]_n$ designate the more-significant and the less-significant n bits of a, respectively).

Furthermore, the decryption unit 207 in the receiver-side apparatus 200, using K', performs the decryption of the ciphertext C, thereby obtaining the plaintext m.

8th Embodiment

In the present embodiment, the explanation will be given below regarding a cipher communication method where the public-key encryption method according to another modified example of the 2nd embodiment is used for the key distribution.

1. Key Generation Processing

Using the key generation unit 201 in the receiver-side apparatus 200, the receiver creates, in advance, the secret key $p_i$ ($1 \leq i \leq d$) given by $p_i$: prime numbers $$p_i \equiv 3 \pmod 4 \quad (1 \leq i \leq d, d > 1) \quad (50)$$

and a public key (N, k, G, H) given by $N = \Pi_{i=1}^d p_i$ $k = |pq|$ $G: \{0,1\}^{k_0} \to \{0,1\}^{n+k_1}$ hash function, $H: \{0,1\}^{n+k_1} \to \{0,1\}^{k_0}$ hash function $\quad (51)$ Also, the publication information is outputted via the communications line 300 or the like, then being sent to the sender-side apparatus 100 or being published. As the publishing method, the well-known method, e.g., the registration into the third party (i.e., the publication information management institution), is available. The other information is stored into the memory 205.

2. Encryption/Decryption Processing (1) Following the operation by the sender and using a data encryption key $K \in \{0, 1\}^n$, the encryption unit 108 in the sender-side apparatus 100 encrypts, by an existing encryption method, a message m becoming the transmission data, thereby creating a ciphertext C. In addition, using the random-number generation unit 101, the sender-side apparatus selects the random number $r \in \{0, 1\}^{k_0}$ and, using the arithmetic-operation unit 103, the power multiplication unit 102, and the remainder arithmetic-operation unit 104, the sender-side apparatus calculates $$s = x0^{K_1} \oplus G(r), \ t = H(s) \oplus r, \quad (52)$$

(where, $n + k_0 + k_1 < k - 2$), and further, calculates $$y_1 = s^2 \mod N, \ y_2 = t, \quad (53)$$

Moreover, the sender-side apparatus, using the communications apparatus 106, transmits $(y_1, y_2)$ together with the ciphertext C to the receiver-side apparatus 200 of the receiver via the communications line 300.

(2) Following the operation by the receiver and using the above-described secret information (p, q) and the power multiplication unit 202, the remainder arithmetic-operation unit 203, and the arithmetic-operation unit 204, the receiver-side apparatus 200 calculates, from $(y_1, y_2)$ $$x_{1,p_i} = y_1^{\frac{(p_i+1)}{4}} \mod p_i \quad (1 \leq i \leq d) \quad (54)$$

and, of $2^d$ expressions $\phi(\pm x_{1,p1}, \pm x_{1,p2}, \ldots, \pm x_{1,pd})$, the apparatus sets an expression satisfying $0 < s' < N/2$ to be s' (Here, $\phi$ designates the ring isomorphism mapping from $Z/(p_1) \times Z/(p_2) \times \ldots \times Z/(p_d)$ to $Z/(N)$ by the Chinese remainder theorem. Also, more than one s' may exist). Moreover, the apparatus calculates $$r = H(s') \oplus t' \quad (55)$$

and, based on $$K' = \begin{cases} [s' \oplus G(r')]^n & \text{if } [s' \oplus G(r')]_{k_1} = 0^{k_1} \\ * & \text{otherwise} \end{cases} \quad (56)$$

calculates K' (Here, it is stipulated that, in the case where K'=*, the receiver-side apparatus 200 denies the decryption of the ciphertext, and informs the operator of a notice to the effect. Also, $[a]^n$ and $[a]_n$ designate the more-significant and the less-significant n bits of a, respectively).

Furthermore, the receiver-side apparatus 200, using the decryption unit 207 and K', performs the decryption of the ciphertext C, thereby obtaining the plaintext m.

9th Embodiment

In the present embodiment, the explanation will be given below concerning the case where, via a cipher communication, the sender of a message m transmits, to the receiver, the message m that becomes the transmission data.

Figure 9:
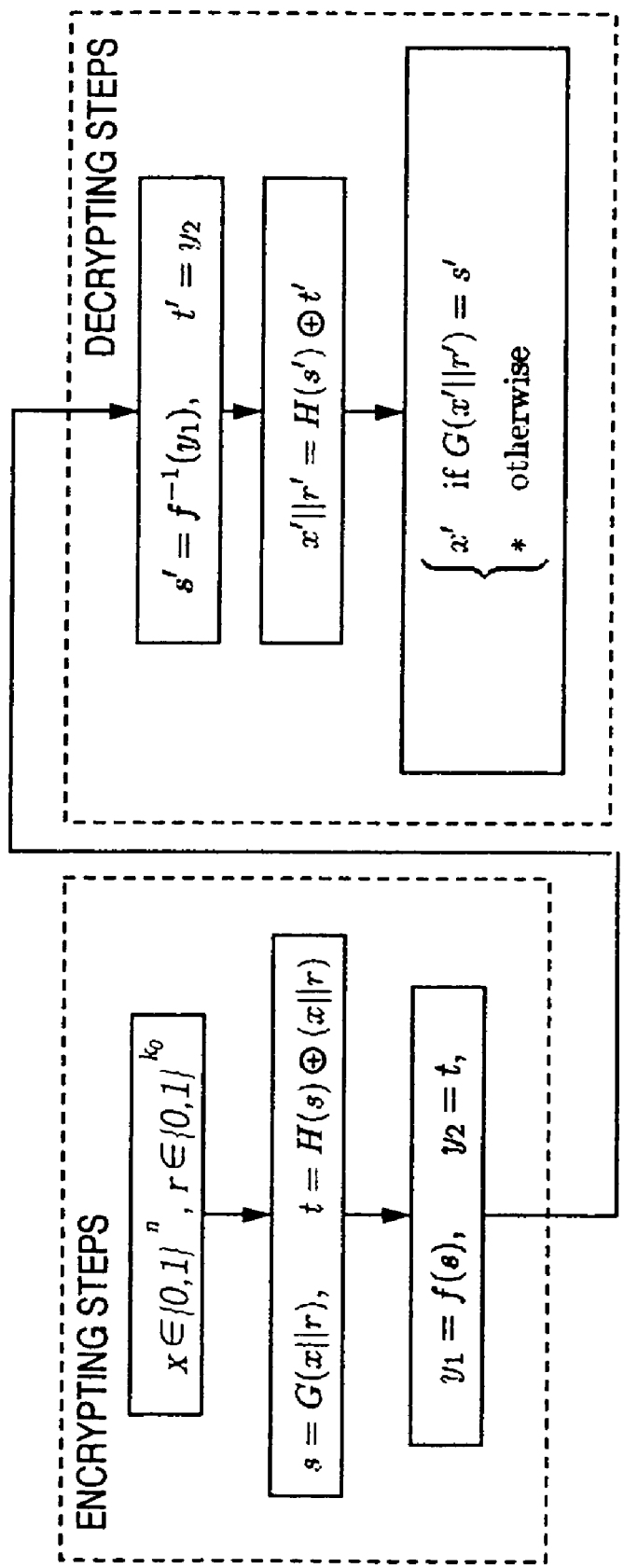
FIG. 9 is a diagram for illustrating the processing steps in a 9th embodiment.

FIG. 1 illustrates the system configuration in the present embodiment. Also, FIG. 9 is a diagram for illustrating the outline of the processing steps in the 9th embodiment.

1. Key Generation Processing

Using the key generation unit 201 in the receiver-side apparatus 200, the receiver creates, in advance, a public key given by $f:\{0,1\}^k \to \{0,1\}^k$ one-way trapdoor permutation, $G:\{0,1\}^{k0} \to \{0,1\}^{n+k1}$ hash function, $H:\{0,1\}^{n+k1} \to \{0,1\}^{k0}$ hash function (57)

and a secret key given by $f^{-1}: \{0,1\}^k \to \{0,1\}^k$ Trapdoor function (58)

Also, the publication information is outputted via the communications line 300 or the like, then being sent to the sender-side apparatus 100 or being published. As the publishing method, the well-known method, e.g., the registration into the third party (i.e., the publication information management institution), is available. The other information is stored into the memory 205.

2. Encryption/Decryption Processing (1) Following the operation by the sender and using the random-number generation unit 101, the sender-side apparatus 100 selects a random number $r \in \{0, 1\}^{k0}$ for a plaintext $x \in \{0, 1\}^n$ and, using the arithmetic-operation unit 103, the sender-side apparatus calculates $s = G(x\|r), t = H(s) \oplus (x\|r),$ (59)

and further, defines $y_1 = f(s), y_2 = t,$ (60)

as the ciphertext. Moreover, the sender-side apparatus, using the communications apparatus 106, transmits the ciphertext $(y_1, y_2)$ to the receiver-side apparatus 200 of the receiver via the communications line 300.

(2) Following the operation by the receiver and using the above-described secret information and the arithmetic-operation unit 204 in the receiver-side apparatus 200, the receiver-side apparatus 200 calculates, from the ciphertext $(y_1, y_2)$, $s' = f^{-1}(y_1), t' = y_2$ (61)

and further, calculates $x'\|r' = H(s') \oplus t'$ (62)

(where, $x' \in \{0, 1\}^n$, $r' \in \{0, 1\}^{k0}$) and, based on $$\begin{cases} x' & \text{if } G(x'\|r') = s' \\ * & \text{otherwise} \end{cases}$$ (63)

decrypts the ciphertext, thereby obtaining the plaintext (Here, it is stipulated that, in the case where x'=*, the receiver-side apparatus 200 denies the decryption of the ciphertext, and informs the operator of a notice to the effect).

As is the case with the public-key encryption method in the 1st embodiment, the public-key encryption method according to the present embodiment can be proved to be semantically-secure against the chosen-ciphertext attack on the premise of the difficulty in determining the inverse function of the one-way trapdoor permutation f.

As compared with the method in the 1st embodiment, the method according to the present embodiment has a feature that the length n of a plaintext can be set regardless of the function f. Namely, it is possible for the user to arbitrarily set the value of n in correspondence with the length of the message that the user wishes to transmit.

10th Embodiment

Figure 10:
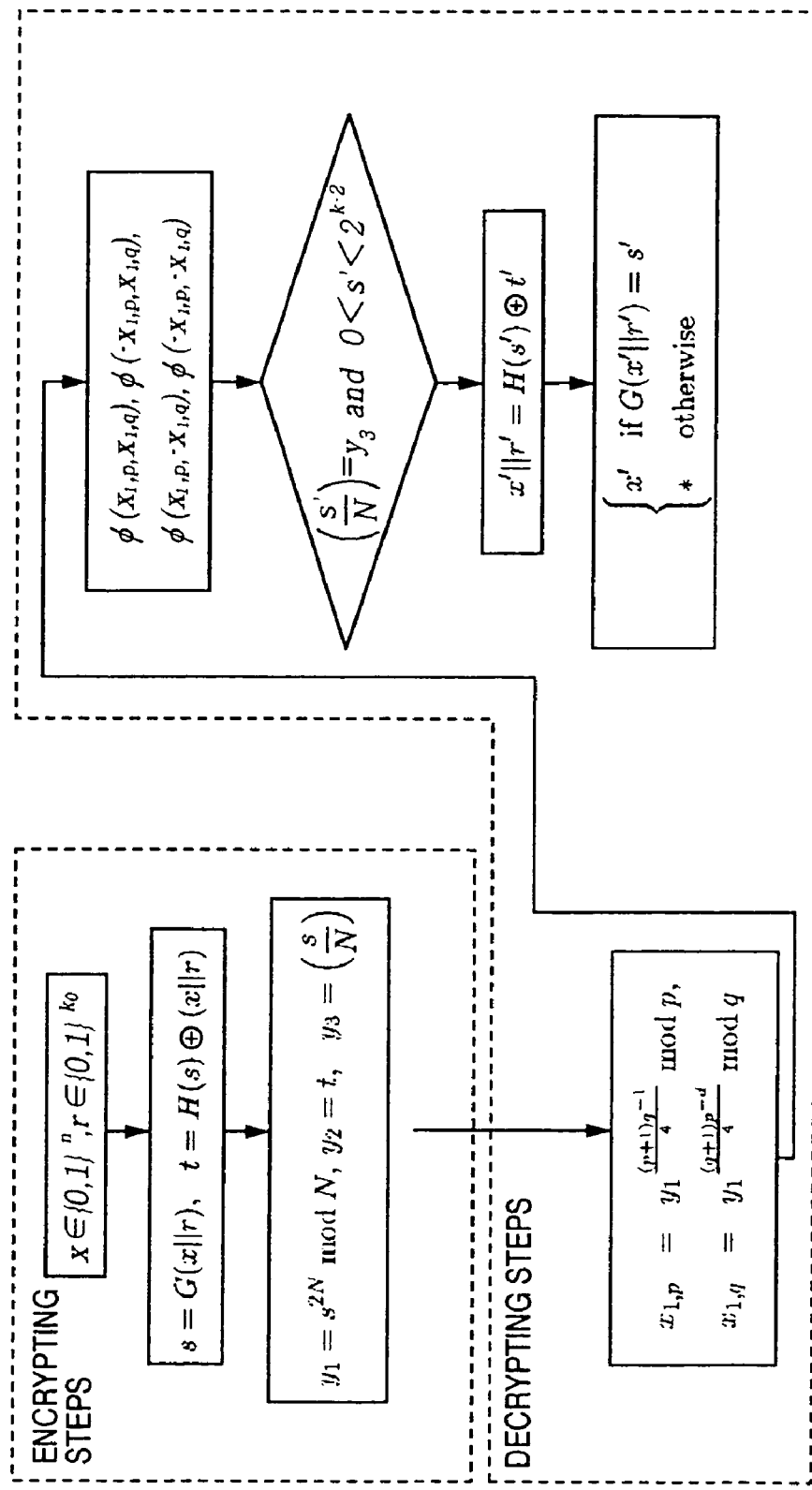
FIG. 10 is a diagram for illustrating the processing steps in a 10th embodiment.

In the present embodiment, the more concrete explanation will be given below concerning the method according to the 9th embodiment. FIG. 10 is a diagram for illustrating the outline of the steps in the 10th embodiment.

1. Key Generation Processing

Using the key generation unit 201 in the receiver-side apparatus 200, the receiver creates, in advance, a secret key (p, q) given by p, q: prime numbers, $p \equiv 3 \pmod 4, q \equiv 3 \pmod 4$ (64)

is created, and further, a public key (N, k, G, H) given by $N = p^d q$ (d is odd number)

$k = |pq|$ $G:\{0,1\}^{n+k0} \to \{0,1\}^{k-2}$ hash function, $H:\{0,1\}^{k-2} \to \{0,1\}^{n+k0}$ hash function (65)

Here, it is stipulated that the manager or the receiver of the present system has determined the value of d in advance, and that the above-described key generation unit can use the value. Also, the publication information is outputted via the communications line 300 or the like, then being sent to the sender-side apparatus 100 or being published. As the publishing method, the well-known method, e.g., the registration into the third party (i.e., the publication information management institution), is available. The other information is stored into the memory 205.

2. Encryption/Decryption Processing (1) Following the operation by the sender and using the random-number generation unit 101, the sender-side apparatus 100 selects a random number $r \in \{0, 1\}^{k0}$ for a plaintext $x \in (0, 1)^n$ and, using the arithmetic-operation unit 103, the power multiplication unit 102, and the remainder arithmetic-operation unit 104, the sender-side apparatus calculates $s = G(x\|r), t = H(s) \oplus (x\|r),$ (66)

and further, defines $y_1 = s^{2N} \bmod N, \; y_2 = t, \; y_3 = \left(\dfrac{s}{N}\right)$ (67)

as the ciphertext (where, a=(m/N) designates the Jacobi symbol). Moreover, the sender-side apparatus, using the communications apparatus 106, transmits the ciphertext $(y_1, y_2, y_3)$ to the receiver-side apparatus 200 of the receiver via the communications line 300.

(2) Following the operation by the receiver and using the above-described secret information (p, q) and the power multiplication unit 202, the remainder arithmetic-operation unit 203, and the arithmetic-operation unit 204, the receiver-side apparatus 200 calculates, from the ciphertext $(y_1, y_2, y_3)$, $$x_{1,p} = y_1^{\frac{(p+1)q^{-1}}{4}} \bmod p,$$

$$x_{1,q} = y_1^{\frac{(q+1)p^{-d}}{4}} \bmod q$$ (68)

and, of expressions $\phi(x_{1,p}, x_{1,q})$, $\phi(-x_{1,p}, x_{1,q})$, $\phi(x_{1,p}, -x_{1,q})$, and $\phi(-x_{1,p}, -x_{1,q})$ the apparatus sets an expression satisfying $(x/N)=y_3$ and $0<x<2^{k-2}$ to be s' (where, φ designates the ring isomorphism mapping from $Z/(p)\times Z/(q)$ to $Z/(pq)$ by the Chinese remainder theorem). Moreover, the apparatus calculates $$x'\|r'=H(s')\oplus t' \qquad (69)$$

(where, $x'\in\{0,1\}^n$, $r'\in\{0,1\}^{k0}$) and, based on $$\begin{cases} x' & \text{if } G(x'\|r') = s' \\ * & \text{otherwise} \end{cases} \qquad (70)$$

decrypts the ciphertext, thereby obtaining the plaintext (Here, it is stipulated that, in the case where x'=*, the receiver-side apparatus 200 denies the decryption of the ciphertext, and informs the operator of a notice to the effect).

Also, the secret key (p, q) can also be created from prime numbers p', q', using p=2p'+1, q=2q'+1.

In the public-key encryption method in the present embodiment, the value of d ($d\geq 1$) is set to be variable. Based on this condition, in the case where the bit length of the plaintext always remains short, the value of d is increased in a range where the unique factorization of n into its prime factors is difficult. This increase allows the decryption processing to be executed at a high-speed.

It can be demonstrated that, in the case of, e.g., d=3, the complete cryptanalysis of the method according to the present embodiment is impossible on the premise of the difficulty in the unique factorization problem of n. Namely, if there exists an algorithm for solving the unique factorization problem of n, the utilization of the algorithm makes it possible to configure an algorithm for executing the complete cryptanalysis of the method according to the present embodiment. Also, if there exists the algorithm for executing the complete cryptanalysis of the method according to the present embodiment, the utilization of the algorithm makes it possible to configure the algorithm for solving the unique factorization problem of n.

11th Embodiment

Figure 11:
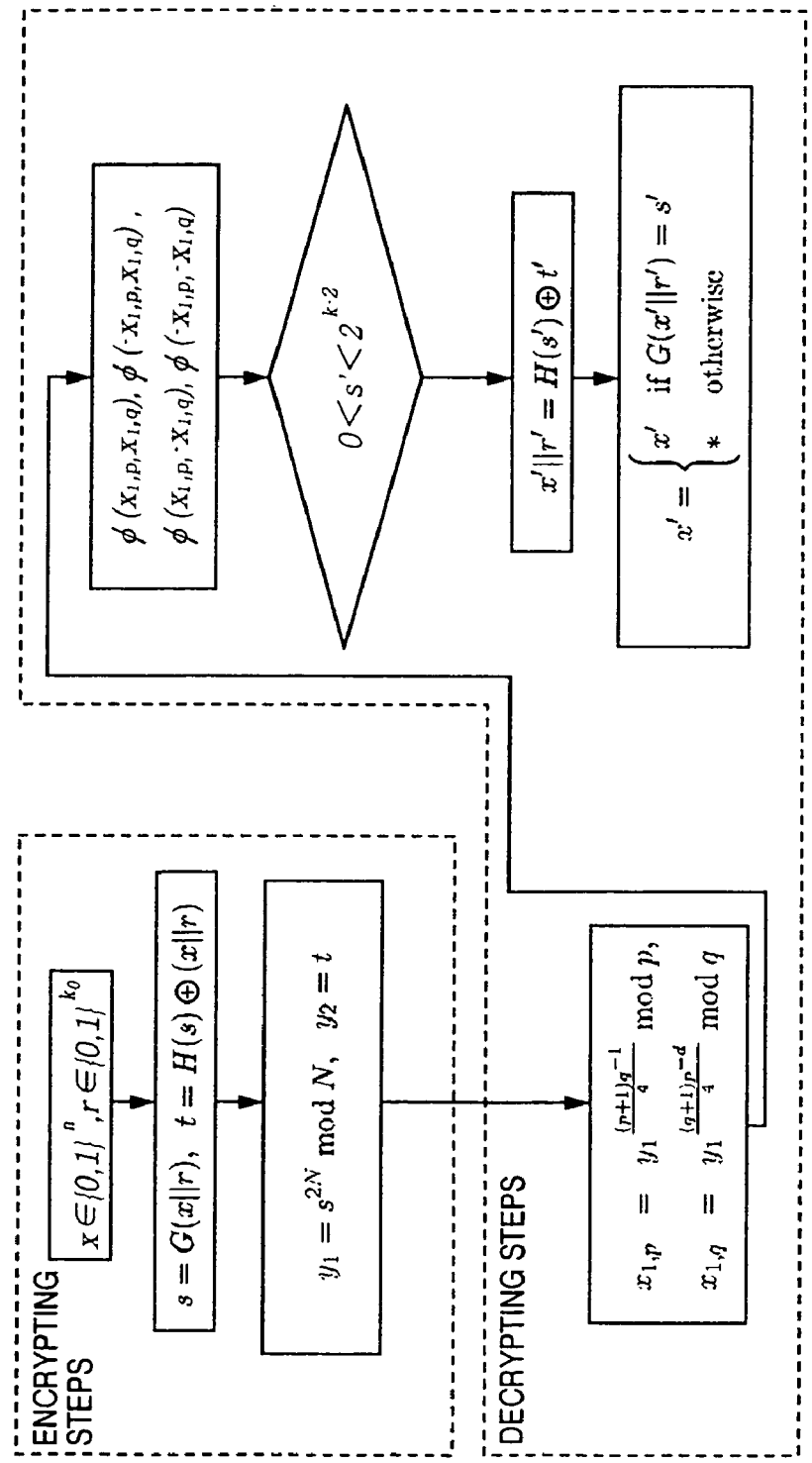
FIG. 11 is a diagram for illustrating the processing steps in an 11th embodiment.

In the present embodiment, the explanation will be given below regarding a modified example of the 10th embodiment. FIG. 11 is a diagram for illustrating the outline of the steps in the 11th embodiment.

1. Key Generation Processing

Using the key generation unit 201 in the receiver-side apparatus 200, the receiver creates, in advance, a secret key (p, q) given by p, q: prime numbers, $$p\equiv 3 \pmod 4, q\equiv 3 \pmod 4 \qquad (71)$$

a public key (N, k, G, H) given by $N=p^d q$ ($d\geq 1$)

$k=|pq|$ $G:\{0,1\}^{n+k0}\to\{0,1\}^{k-2}$ hash function, $H:\{0,1\}^{k-2}\to\{0,1\}^{n+k0}$ hash function $\qquad (72)$ Also, the publication information is outputted via the communications line 300 or the like, then being sent to the sender-side apparatus 100 or being published. As the publishing method, the well-known method, e.g., the registration into the third party (i.e., the publication information management institution), is available. The other information is stored into the memory 205.

2. Encryption/Decryption Processing (1) Following the operation by the sender and using the random-number generation unit 101, the sender-side apparatus 100 selects a random number $r\in\{0,1\}^{k0}$ for a plaintext $x\in\{0,1\}^n$ and, using the arithmetic-operation unit 103, the power multiplication unit 102, and the remainder arithmetic-operation unit 104, the sender-side apparatus calculates $$s=G(x\|r), t=H(s)\oplus(x\|r), \qquad (73)$$

and further, defines $$y_1=s^{2N} \bmod N, y_2=t, \qquad (74)$$

as the ciphertext. Moreover, the sender-side apparatus, using the communications apparatus 106, transmits the ciphertext ($y_1, y_2$) to the receiver-side apparatus 200 of the receiver via the communications line 300.

(2) Following the operation by the receiver and using the above-described secret information (p, q) and the power multiplication unit 202, the remainder arithmetic-operation unit 203, and the arithmetic-operation unit 204, the receiver-side apparatus 200 calculates, from the ciphertext ($y_1, y_2$)

$$x_{1,p} = y_1^{\frac{(p+1)q-1}{4}} \bmod p, \qquad (75)$$

$$x_{1,q} = y_1^{\frac{(q+1)p^{-d}}{4}} \bmod q$$

and, of expressions $\phi(x_{1,p}, x_{1,q})$, $\phi(-x_{1,p}, x_{1,q})$, $(x_{1,p}, -x_{1,q})$, and $\phi(-x_{1,p}, -x_{1,q})$, the apparatus sets an expression satisfying $0<x<2^{k-2}$ to be s' (Here, φ designates a ring isomorphism mapping from $Z/(p)\times Z/(q)$ to $Z/(pq)$ by the Chinese remainder theorem, and more than one s' may exist). Moreover, the apparatus calculates $$x'\|r'=H(s')\oplus t' \qquad (76)$$

(where, $x'\in\{0,1\}^n$, $r'\in\{0,1\}^{k0}$) and, based on $$x' = \begin{cases} x' & \text{if } G(x'\|r') = s' \\ * & \text{otherwise} \end{cases} \qquad (77)$$

decrypts the ciphertext, thereby obtaining the plaintext (Here, it is stipulated that, in the case where x'=*, the receiver-side apparatus 200 denies the decryption of the ciphertext, and informs the operator of a notice to the effect).

Also, the secret key (p, q) can also be created from prime numbers p', q', using p=2p'+1, q=2q'+1.

In the public-key encryption method in the present embodiment, the value of d ($d\geq 1$) is set to be variable. Based on this condition, in the case where the bit length of the plaintext always remains short, the value of d is increased in a range where the unique factorization of n into its prime factors is difficult. This increase allows the decryption processing to be executed at a high-speed.

It can be demonstrated that, in the case of, e.g., d=3, the complete cryptanalysis of the method according to the present embodiment is impossible on the premise of the difficulty in the unique factorization problem of n. Namely, if there exists an algorithm for solving the unique factorization problem of n, the utilization of the algorithm makes it possible to configure an algorithm for executing the complete cryptanalysis of the method according to the present embodiment. Also, if there exists the algorithm for executing the complete cryptanalysis of the method according to the present embodiment, the utilization of the algorithm makes it possible to configure the algorithm for solving the unique factorization problem of n.

12th Embodiment

Figure 12:
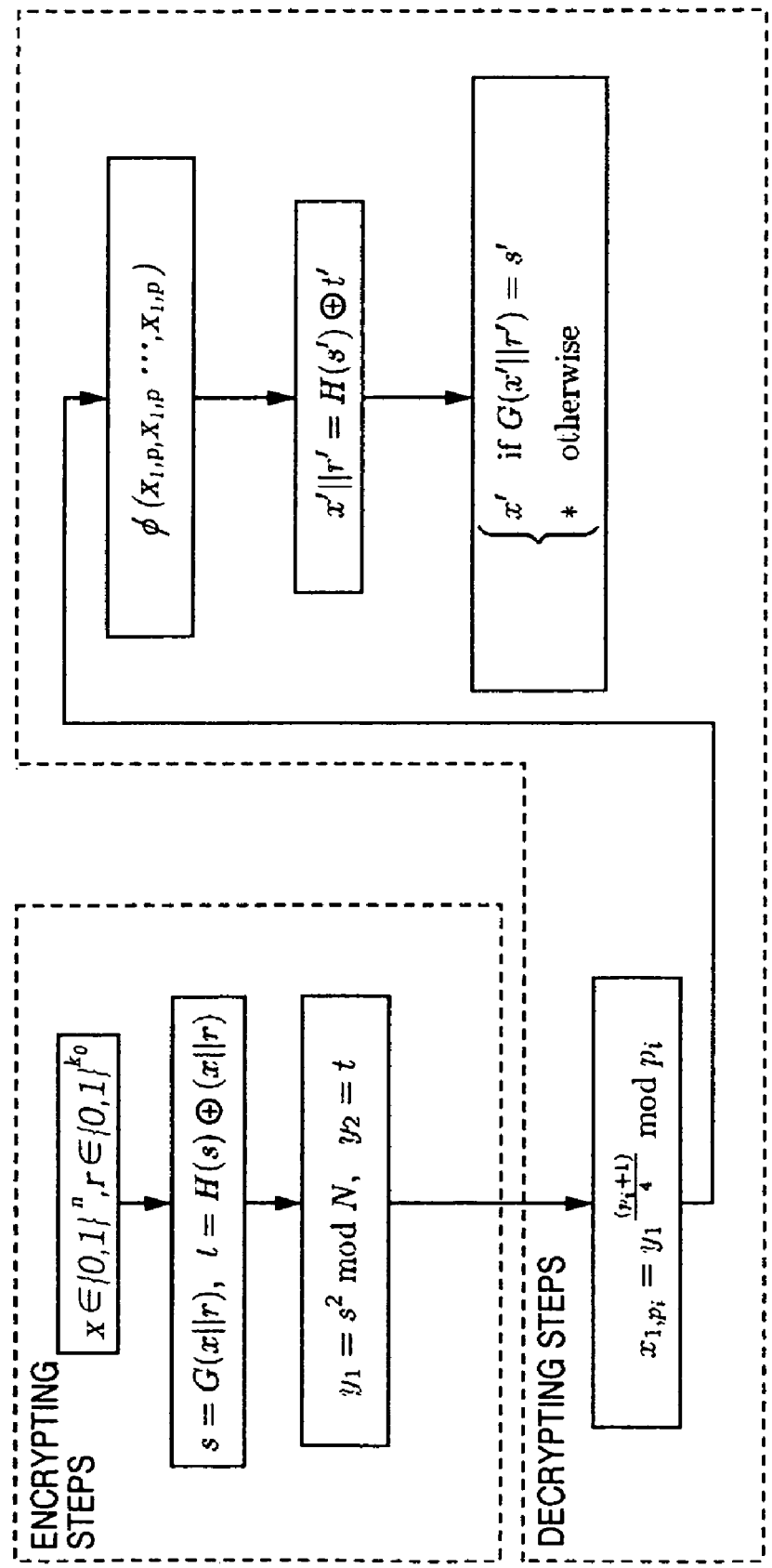
FIG. 12 is a diagram for illustrating the processing steps in a 12th embodiment.

In the present embodiment, the explanation will be given below regarding another modified example of the 10th embodiment. FIG. 12 is a diagram for illustrating the outline of the steps in the 12th embodiment.

1. Key Generation Processing

Using the key generation unit 201 in the receiver-side apparatus 200, the receiver creates, in advance, a secret key $p_i$ ($1 \leq i \leq d$) given by $p_i$: prime numbers $$p_i \equiv 3 \pmod{4} \ (1 \leq i \leq d, d>1) \tag{78}$$

and a public key (N, k, G, H) given by $N = \Pi_{i=1}^{d} p_i$ $k = |N|$ $G: \{0,1\}^{n+k_0} \to \{0,1\}^k$ hash function, $$H: \{0,1\}^k \to \{0,1\}^{n+k_0} \text{ hash function} \tag{79}$$

Also, the publication information is outputted via the communications line 300 or the like, then being sent to the sender-side apparatus 100 or being published. As the publishing method, the well-known method, e.g., the registration into the third party (i.e., the publication information management institution), is available. The other information is stored into the memory 205.

2. Encryption/Decryption Processing (1) Following the operation by the sender and using the random-number generation unit 101, the sender-side apparatus 100 selects a random number r $$s = G(x \| r), t = H(s) \oplus (x \| r), \tag{80}$$

(where, $k-1 \leq \log_2(N+1)$), and further, defines $$y_1 = s^2 \bmod N, y_2 = t, \tag{81}$$

as the ciphertext. Moreover, the sender-side apparatus, using the communications apparatus 106, transmits the ciphertext $(y_1, y_2)$ to the receiver-side apparatus 200 of the receiver via the communications line 300.

(2) Following the operation by the receiver and using the above-described secret information (p, q) and the power multiplication unit 202, the remainder arithmetic-operation unit 203, and the arithmetic-operation unit 204, the receiver-side apparatus 200 calculates, from the ciphertext $(y_1, y_2)$ $$x_{1,p_i} = y_1^{\frac{(p_i+1)}{4}} \bmod p_i \ (1 \leq i \leq d) \tag{82}$$

and, of $2^d$ expressions $\phi(\pm x_{1,p_2}, \pm x_{1,p_2}, \ldots, \pm x_{1,p_d})$, the apparatus sets an expression satisfying $0 < s' < N/2$ to be s' (Here, $\phi$ designates a ring isomorphism mapping from $Z/(p_1) \times Z/(p_2) \times \ldots \times Z/(p_d)$ to $Z/(N)$ by the Chinese remainder theorem. Also, more than one s' may exist). Moreover, the apparatus calculates $$x' \| r' = H(s') \oplus t' \tag{83}$$

(where, $x' \in \{0,1\}^n$, $r' \in \{0,1\}^{k_0}$) and, based on $$\begin{cases} x' & \text{if } G(x' \| r') = s' \\ * & \text{otherwise} \end{cases} \tag{84}$$

decrypts the ciphertext, thereby obtaining the plaintext (Here, it is stipulated that, in the case where x'=*, the receiver-side apparatus 200 denies the decryption of the ciphertext, and informs the operator of a notice to the effect).

Also, the secret key p, q can also be created from prime numbers p', q', using p=2p'+1, q=2q'+1.

In the public-key encryption method in the present embodiment, the value of d (d>1) is set to be variable.

It can be demonstrated that the complete cryptanalysis of the method according to the present embodiment is impossible on the premise of the difficulty in the unique factorization problem of n. Namely, if there exists an algorithm for solving the unique factorization problem of n, the utilization of the algorithm makes it possible to configure an algorithm for executing the complete cryptanalysis of the method according to the present embodiment. Also, if there exists the algorithm for executing the complete cryptanalysis of the method according to the present embodiment, the utilization of the algorithm makes it possible to configure the algorithm for solving the unique factorization problem of n.

13th Embodiment

In the present embodiment, the explanation will be given below concerning a cipher communication method where the public-key encryption method according to the 9th embodiment is used for the key distribution.

FIG. 1 illustrates the system configuration in the present embodiment.

1. Key Generation Processing

Using the key generation unit 201 in the receiver-side apparatus 200, the receiver creates, in advance, a public key given by $f: \{0,1\}^k \to \{0,1\}^k$ one-way trapdoor permutation, $G: \{0,1\}^{n+k_0} \to \{0,1\}^k$ hash function, $$H: \{0,1\}^k \to \{0,1\}^{n+k_0} \text{ hash function} \tag{85}$$

and a secret key given by $$f^{-1}: \{0,1\}^k \to \{0,1\}^k \text{ Trapdoor function} \tag{86}$$

Also, the publication information is outputted via the communications line 300 or the like, then being sent to the sender-side apparatus 100 or being published. As the publishing method, the well-known method, e.g., the registration into the third party (i.e., the publication information management institution), is available. The other information is stored into the memory 205.

2. Encryption/Decryption Processing (1) Following the operation by the sender and using a data encryption key $K \in \{0,1\}^n$, the encryption unit 108 in the sender-side apparatus 100 encrypts, by an existing encryption method, a message m becoming the transmission data, thereby creating a ciphertext C. In addition, using the random-number generation unit 101, the sender-side apparatus selects a random number r∈$\{0, 1\}^{k0}$ and, using the arithmetic-operation unit 103, calculates $$s=G(K\|r),\ t=H(s)\oplus(K\|r), \tag{87}$$

and further, calculates $$y_1=f(s),\ y_2=t, \tag{88}$$

Moreover, the sender-side apparatus, using the communications apparatus 106, transmits ($y_1$, $y_2$) together with the ciphertext C to the receiver-side apparatus 200 of the receiver via the communications line 300.

(2) Following the operation by the receiver and using the above-described secret information and the arithmetic-operation unit 204 in the receiver-side apparatus 200, the receiver-side apparatus 200 calculates, from ($y_1$, $y_2$)

$$s'=f^{-1}(y_1),\ t'=y_2 \tag{89}$$

and further, calculates $$K'\|r'=H(s')\oplus t' \tag{90}$$

(where, K'∈$\{0, 1\}^n$, r'∈$\{0, 1\}^{k0}$) and, based on $$\begin{cases} K' & \text{if } G(K'\|r')=s' \\ * & \text{otherwise} \end{cases} \tag{91}$$

calculates K' (Here, it is stipulated that, in the case where K'=*, the receiver-side apparatus 200 denies the decryption of the ciphertext, and informs the operator of a notice to the effect).

Furthermore, the decryption unit 207 in the receiver-side apparatus 200, using K', performs the decryption of the ciphertext C, thereby obtaining the plaintext m.

14th Embodiment

In the present embodiment, the explanation will be given below concerning a cipher communication method where the public-key encryption method according to the 10th embodiment is used for the key distribution.

1. Key Generation Processing

Using the key generation unit 201 in the receiver-side apparatus 200, the receiver creates, in advance, a secret key (p, q) given by p, q: prime numbers, $$p\equiv 3\pmod 4,\ q\equiv 3\pmod 4 \tag{92}$$

a public key (N, k, G, H) given by $N=p^dq$ (d is odd number)

$k=|pq|$ $G:\{0,1\}^{n-k0}\to\{0,1\}^{k-1}$ hash function, $H:\{0,1\}^{k-2}\to\{0,1\}^{n+k0}$ hash function (93)

Also, the publication information is outputted via the communications line 300 or the like, then being sent to the sender-side apparatus 100 or being published. As the publishing method, the well-known method, e.g., the registration into the third party (i.e., the publication information management institution), is available. The other information is stored into the memory 205.

2. Encryption/Decryption Processing (1) Following the operation by the sender and using a data encryption key K∈$\{0, 1\}^n$, the encryption unit 108 in the sender-side apparatus 100 encrypts, by an existing encryption method, a message m becoming the transmission data, thereby creating a ciphertext C. In addition, using the random-number generation unit 101, the sender-side apparatus selects a random number r∈$\{0, 1\}^{k0}$ and, using the arithmetic-operation unit 103, the power multiplication unit 102, and the remainder arithmetic-operation unit 104, the sender-side apparatus calculates $$s=G(K\|r),\ t=H(s)\oplus(K\|r), \tag{94}$$

and further, calculates $$y_1=s^{2N}\bmod N,\ y_2=t,\ y_3=\left(\frac{s}{N}\right) \tag{95}$$

(where, a=(m/N) designates the Jacobi symbol). Moreover, the sender-side apparatus, using the communications apparatus 106, transmits ($y_1$, $y_2$, $y_3$) together with the ciphertext C to the receiver-side apparatus 200 of the receiver via the communications line 300.

(2) Following the operation by the receiver and using the above-described secret information (p, q) and the power multiplication unit 202, the remainder arithmetic-operation unit 203, and the arithmetic-operation unit 204, the receiver-side apparatus 200 calculates, from ($y_1$, $y_2$, $y_3$)

$$x_{1,p}=y_1^{\frac{(p+1)q^{-1}}{4}}\bmod p, \tag{96}$$

$$x_{1,q}=y_1^{\frac{(q+1)p^{-d}}{4}}\bmod q$$

and, of expressions $\phi(x_{1,p}, x_{1,q})$, $\phi(-x_{1,p}, x_{1,q})$, $\phi(x_{1,p}, -x_{1,q})$, and $\phi(-x_{1,p}, -x_{1,q})$ the apparatus sets an expression satisfying (x/N)=$y_3$ and 0<x<$2^{k-2}$ to be s' (where, $\phi$ designates the ring isomorphism mapping from Z/(p)×Z/(q) to Z/(pq) by the Chinese remainder theorem). Moreover, the apparatus calculates $$K'\|r'=H(s')\oplus t' \tag{97}$$

(where, K'∈$\{0, 1\}^n$, r'∈$\{0, 1\}^{k0}$) and, based on $$\begin{cases} K' & \text{if } G(K'\|r')=s' \\ * & \text{otherwise} \end{cases} \tag{98}$$

calculates K' (Here, it is stipulated that, in the case where K'=*, the receiver-side apparatus 200 denies the decryption of the ciphertext, and informs the operator of a notice to the effect).

Furthermore, the decryption unit 207 in the receiver-side apparatus 200, using K', performs the decryption of the ciphertext C, thereby obtaining the plaintext m.

15th Embodiment

In the present embodiment, the explanation will be given below regarding a cipher communication method where the public-key encryption method according to the 11th embodiment is used for the key distribution.

1. Key Generation Processing

Using the key generation unit 201 in the receiver-side apparatus 200, the receiver creates, in advance, a secret key (p, q) given by p, q: prime numbers, $$p \equiv 3 \pmod 4, q \equiv 3 \pmod 4 \tag{99}$$

and a public key (N, k, G, H) given by $N = p^d q \; (d \geq 1)$ $k = |pq|$ $G: \{0,1\}^{n-k_0} \to \{0,1\}^{k-2}$ hash function, $$H: \{0,1\}^{k-2} \to \{0,1\}^{n-k_0} \text{ hash function} \tag{100}$$

Also, the publication information is outputted via the communications line 300 or the like, then being sent to the sender-side apparatus 100 or being published. As the publishing method, the well-known method, e.g., the registration into the third party (i.e., the publication information management institution), is available. The other information is stored into the memory 205.

2. Encryption/Decryption Processing (1) Following the operation by the sender and using a data encryption key $K \in \{0, 1\}^n$, the encryption unit 108 in the sender-side apparatus 100 encrypts, by an existing encryption method, a message m becoming the transmission data, thereby creating a ciphertext C. In addition, using the random-number generation unit 101, the sender-side apparatus selects a random number $r \in \{0, 1\}^{k_0}$ and, using the arithmetic-operation unit 103, the power multiplication unit 102, and the remainder arithmetic-operation unit 104, the sender-side apparatus calculates $$s = G(K\|r), t = H(s) \oplus (K\|r), \tag{101}$$

and further, calculates $$y_1 = s^{2N} \bmod N, y_2 = t, \tag{102}$$

Moreover, the sender-side apparatus, using the communications apparatus 106, transmits $(y_1, y_2)$ together with the ciphertext C to the receiver-side apparatus 200 of the receiver via the communications line 300.

(2) Following the operation by the receiver and using the above-described secret information (p, q) and the power multiplication unit 202, the remainder arithmetic-operation unit 203, and the arithmetic-operation unit 204, the receiver-side apparatus 200 calculates, from $(y_1, y_2)$, $$x_{1,p} = y_1^{\frac{(p+1)q-1}{4}} \bmod p, \tag{103}$$
$$x_{1,q} = y_1^{\frac{(q+1)p-d}{4}} \bmod q$$

and, of expressions $\phi(x_{1,p}, x_1), \phi(-x_{1,p}, x_{1,q}), \phi(x_{1,p}, -x_{1,q})$, and $\phi(-x_{1,p}, -x_{1,q})$, the apparatus sets an expression satisfying $0 < x < 2^{k-2}$ to be s' (where, $\phi$ designates the ring isomorphism mapping from $Z/(p) \times Z/(q)$ to $Z/(pq)$ by the Chinese remainder theorem, and more than one s' may exist). Moreover, the apparatus calculates $$K'\|r' = H(s') \oplus t' \tag{104}$$

(where, $K' \in \{0, 1\}^n$, $r' \in \{0, 1\}^{k_0}$) and, based on $$\begin{cases} K' & \text{if } G(K'\|r') = s' \\ * & \text{otherwise} \end{cases} \tag{105}$$

calculates K' (Here, it is stipulated that, in the case where K'=*, the receiver-side apparatus 200 denies the decryption of the ciphertext, and informs the operator of a notice to the effect).

Furthermore, the decryption unit 207 in the receiver-side apparatus 200, using K', performs the decryption of the ciphertext C, thereby obtaining the plaintext m.

16th Embodiment

In the present embodiment, the explanation will be given below regarding a cipher communication method where the public-key encryption method according to another modified example of the 10th embodiment is used for the key distribution.

1. Key Generation Processing

Using the key generation unit 201 in the receiver-side apparatus 200, the receiver creates, in advance, a secret key $p_i$ ($1 \leq i \leq d$) given by $p_i$: prime numbers $$p_i \equiv 3 \pmod 4 \; (1 \leq i \leq d, d > 1) \tag{106}$$

and a public key (N, k, G, H) given by $N = \Pi_{i=1}^{d} p_i$ $k = |pq|$ $G: \{0,1\}^{n+k_0} \to \{0,1\}^{k}$ hash function, $$H: \{0,1\}^{k} \to \{0,1\}^{n+k_0} \text{ hash function} \tag{107}$$

Also, the publication information is outputted via the communications line 300 or the like, then being sent to the sender-side apparatus 100 or being published. As the publishing method, the well-known method, e.g., the registration into the third party (i.e., the publication information management institution), is available. The other information is stored into the memory 205.

2. Encryption/Decryption Processing (1) Following the operation by the sender and using a data encryption key $K \in \{0, 1\}^n$, the encryption unit 108 in the sender-side apparatus 100 encrypts, by an existing encryption method, a message m becoming the transmission data, thereby creating a ciphertext C. In addition, using the random-number generation unit 101, the sender-side apparatus selects a random number $r \in \{0, 1\}^{k_0}$ and, using the arithmetic-operation unit 103, the power multiplication unit 102, and the remainder arithmetic-operation unit 104, the sender-side apparatus calculates $$s = G(K\|r), t = H(s) \oplus (K\|r), \tag{108}$$

(where, $k-1 \leq \log_2(N+1)$), and further, calculates $$y_1 = s^2 \bmod N, y_2 = t, \tag{109}$$

Moreover, the sender-side apparatus, using the communications apparatus 106, transmits $(y_1, y_2)$ together with the ciphertext C to the receiver-side apparatus 200 of the receiver via the communications line 300.

(2) Following the operation by the receiver and using the above-described secret information (p, q) and the power multiplication unit 202, the remainder arithmetic-operation unit 203, and the arithmetic-operation unit 204, the receiver-side apparatus 200 calculates, from $(y_1, y_2)$, $$x_{1,p_i} = y_1^{\frac{(p_i+1)}{4}} \bmod p_i \; (1 \leq i \leq d) \tag{110}$$

and, of $2^d$ expressions $\phi(\pm x_{1,\,p1}, \pm x_{1,\,p2}, \ldots, \pm x_{1,\,pd})$ the apparatus sets an expression satisfying $0 < s' < N/2$ to be s' (Here, $\phi$ designates a ring isomorphism mapping from $Z/(p_1) \times Z/(p_2) \times \ldots \times Z/(p_d)$ to $Z/(N)$ by the Chinese remainder theorem. Also, more than one s' may exist). Moreover, the apparatus calculates $$K' \| r' = H(s') \oplus t' \tag{111}$$

(where, $K' \in \{0,1\}^n$, $r' \in \{0,1\}^{k0}$) and, based on $$\begin{cases} K' & \text{if } G(K' \| r') = s' \\ * & \text{otherwise} \end{cases} \tag{112}$$

calculates K' (Here, it is stipulated that, in the case where K'=*, the receiver-side apparatus 200 denies the decryption of the ciphertext, and informs the operator of a notice to the effect).

Furthermore, the decryption unit 207 in the receiver-side apparatus 200, using K', performs the decryption of the ciphertext C, thereby obtaining the plaintext m.

17th Embodiment

In the present embodiment, the explanation will be given below concerning the case where, via a cipher communication, the sender of a message m transmits, to the receiver, the message m that becomes the transmission data.

Figure 13:
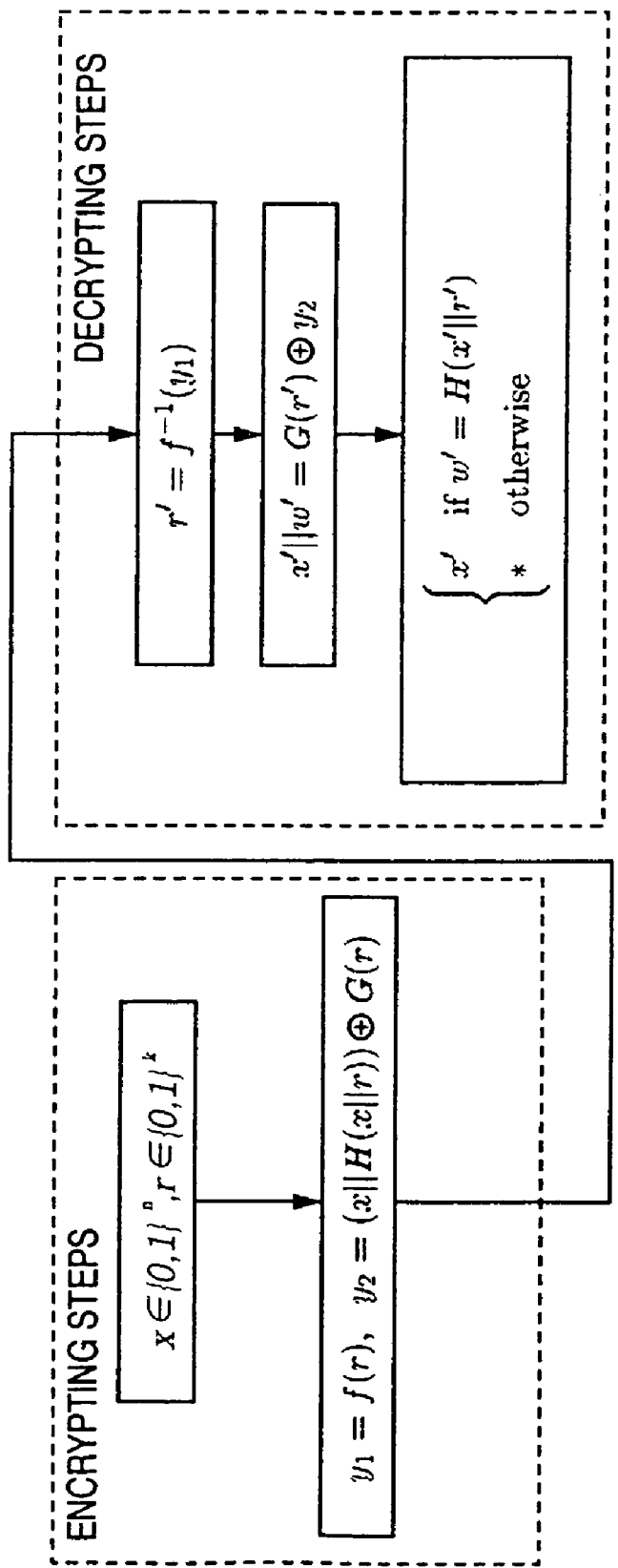
FIG. 13 is a diagram for illustrating the processing steps in a 17th embodiment.

FIG. 1 illustrates the system configuration in the present embodiment. FIG. 13 is a diagram for illustrating the outline of the processing steps in the 17th embodiment.

1. Key Generation Processing

Using the key generation unit 201 in the receiver-side apparatus 200, the receiver creates, in advance, a public key given by $f:\{0,1\}^k \to \{0,1\}^k$ one-way trapdoor permutation, $G:\{0,1\}^{k0} \to \{0,1\}^{n+k0}$ hash function, $H:\{0,1\}^{n-k} \to \{0,1\}^{k0}$ hash function (113)

and a secret key given by $f^{-1}:\{0,1\}^k \to \{0,1\}^k$ Trapdoor function (114)

Also, the publication information is outputted via the communications line 300 or the like, then being sent to the sender-side apparatus 100 or being published. As the publishing method, the well-known method, e.g., the registration into the third party (i.e., the publication information management institution), is available. The other information is stored into the memory 205.

2. Encryption/Decryption Processing (1) Following the operation by the sender and using the random-number generation unit 101, the sender-side apparatus 100 selects a random number $r \in \{0,1\}^k$ for a plaintext $x \in \{0,1\}^n$ and, using the arithmetic-operation unit 103, the sender-side apparatus calculates and defines, as the ciphertext, $$y_1 = f(r), y_2 = (x \| H(x \| r)) \oplus G(r), \tag{115}$$

Moreover, the sender-side apparatus, using the communications apparatus 106, transmits the ciphertext $(y_1, y_2)$ to the receiver-side apparatus 200 of the receiver via the communications line 300.

(2) Following the operation by the receiver and using the above-described secret information and the arithmetic-operation unit 204 in the receiver-side apparatus 200, the receiver-side apparatus 200 calculates, from the ciphertext $(y_1, y_2)$, $$r = f^{-1}(y_1) \tag{116}$$

and further, calculates $$x' \| w' = G(r') \oplus y_2 \tag{117}$$

(where, $x' \in \{0,1\}^n$, $w' \in \{0,1\}^{k0}$) and, based on $$\begin{cases} x' & \text{if } w' = H(x' \| r') \\ * & \text{otherwise} \end{cases} \tag{118}$$

decrypts the ciphertext, thereby obtaining the plaintext (Here, it is stipulated that, in the case where x'=*, the receiver-side apparatus 200 denies the decryption of the ciphertext, and informs the operator of a notice to the effect).

As is the case with the public-key encryption method in the 1st embodiment, the public-key encryption method according to the present embodiment can be proved to be semantically-secure against the chosen-ciphertext attack on the premise of the difficulty in determining the inverse function of the one-way trapdoor permutation f.

As compared with the methods in the 1st and the 9th embodiments, the method according to the present embodiment has a feature of making it possible to perform a preprocessing calculation of $y_1$, i.e., a part of the ciphertext. Namely, since it is possible to calculate $y_1$ independently of the plaintext, performing the calculation in advance allows the high-speed encryption processing to be implemented.

Also, as is the case with the public-key encryption method in the 9th embodiment, the method according to the present embodiment has the feature that the length n of a plaintext can be set regardless of the function f. Namely, it is possible for the user to arbitrarily set the value of n in correspondence with the length of the message that the user wishes to transmit.

18th Embodiment

Figure 14:
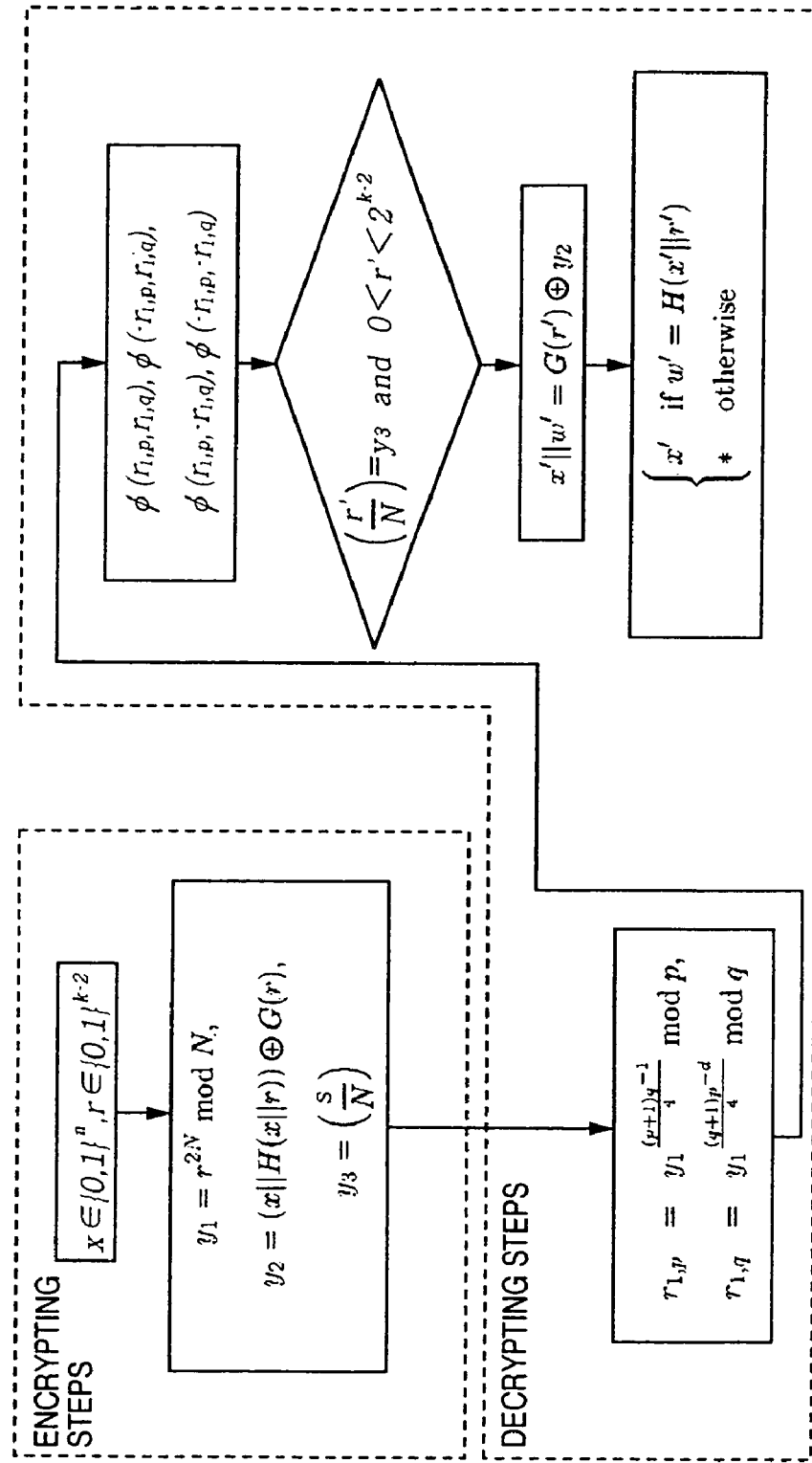
FIG. 14 is a diagram for illustrating the processing steps in an 18th embodiment.

In the present embodiment, the more concrete explanation will be given below concerning the method according to the 17th embodiment. FIG. 14 is a diagram for illustrating the outline of the steps in the 18th embodiment.

1. Key Generation Processing

Using the key generation unit 201 in the receiver-side apparatus 200, the receiver creates, in advance, a secret key (p, q) given by p, q: prime numbers, $$p \equiv 3 (\bmod\ 4),\ q \equiv 3 (\bmod\ 4) \tag{119}$$

a public key (N, k, G, H) given by $N = p^d q$ (d is odd number)

$k = |pq|$ $G: \{0,1\}^{k-2} \to \{0,1\}^{n-k_0}$ hash function, $$H: \{0,1\}^{n+k-2} \to \{0,1\}^{k_0}\ \text{hash function} \tag{120}$$

Also, the publication information is outputted aria the communications line 300 or the like, then being sent to the sender-side apparatus 100 or being published. As the publishing method, the well-known method, e.g., the registration into the third party (i.e., the publication information management institution), is available. The other information is stored into the memory 205.

2. Encryption/Decryption Processing (1) Following the operation by the sender and using the random-number generation unit 101, the sender-side apparatus 100 selects a random number $r \in \{0, 1\}^{k-2}$ for a plaintext $x \in \{0, 1\}^n$ and, using the arithmetic-operation unit 103, the power multiplication unit 102, and the remainder arithmetic-operation unit 104, the sender-side apparatus calculates and defines, as the ciphertext, $$y_1 = r^{2N} \bmod N,\ y_2 = (x \| H(x \| r)) \oplus G(r),\ y_3 = \left(\frac{r}{N}\right) \tag{121}$$

(where, a=(m/N) designates the Jacobi symbol). Moreover, the sender-side apparatus, using the communications apparatus 106, transmits the ciphertext $(y_1, y_2, y_3)$ to the receiver-side apparatus 200 of the receiver via the communications line 300.

(2) Following the operation by the receiver and using the above-described secret information (p, q) and the power multiplication unit 202, the remainder arithmetic-operation unit 203, and the arithmetic-operation unit 204, the receiver-side apparatus 200 calculates, from the ciphertext $(y_1, y_2, y_3)$ $$r_{1,p} = y_1^{\frac{(p+1)q-1}{4}} \bmod p,$$

$$r_{1,q} = y_1^{\frac{(q+1)p^{-d}}{4}} \bmod q \tag{122}$$

and, of expressions $\phi(r_{1,p}, r_{1,q})$, $\phi(-r_{1,p}, r_{1,q})$, $\phi(r_{1,p}, -r_{1,q})$ and $\phi(-r_{1,p}, -r_{1,q})$, the apparatus sets an expression satisfying $(r/N) = y_3$ and $0 < r < 2^{k-2}$ to be r' (where, $\phi$ designates a ring isomorphism mapping from $Z/(p) \times Z/(q)$ to $Z/(pq)$ by the Chinese remainder theorem). Moreover, the apparatus calculates $$x' \| w' = G(r') \oplus y_2 \tag{123}$$

(where, $x' \in \{0, 1\}^n$, $w' \in \{0, 1\}^{k_0}$) and, based on $$\begin{cases} x' & \text{if } w' = H(x' \| r') \\ * & \text{otherwise} \end{cases} \tag{124}$$

decrypts the ciphertext, thereby obtaining the plaintext (Here, it is stipulated that, in the case where x'=*, the receiver-side apparatus 200 denies the decryption of the ciphertext, and informs the operator of a notice to the effect).

Also, the secret key (p, q) can also be created from prime numbers p', q', using p=2p'+1, q=2q'+1.

In the public-key encryption method in the present embodiment, the value of d ($d \geq 1$) is set to be variable. Based on this condition, in the case where the bit length of the plaintext always remains short, the value of d is increased in a range where the unique factorization of n into its prime factors is difficult. This increase allows the decryption processing to be executed at a high-speed.

It can be demonstrated that, in the case of, e.g., d=3, the complete cryptanalysis of the method according to the present embodiment is impossible on the premise of the difficulty in the unique factorization problem of n. Namely, if there exists an algorithm for solving the unique factorization problem of n, the utilization of the algorithm makes it possible to configure an algorithm for executing the complete cryptanalysis of the method according to the present embodiment. Also, if there exists the algorithm for executing the complete cryptanalysis of the method according to the present embodiment, the utilization of the algorithm makes it possible to configure the algorithm for solving the unique factorization problem of n.

19th Embodiment

Figure 15:
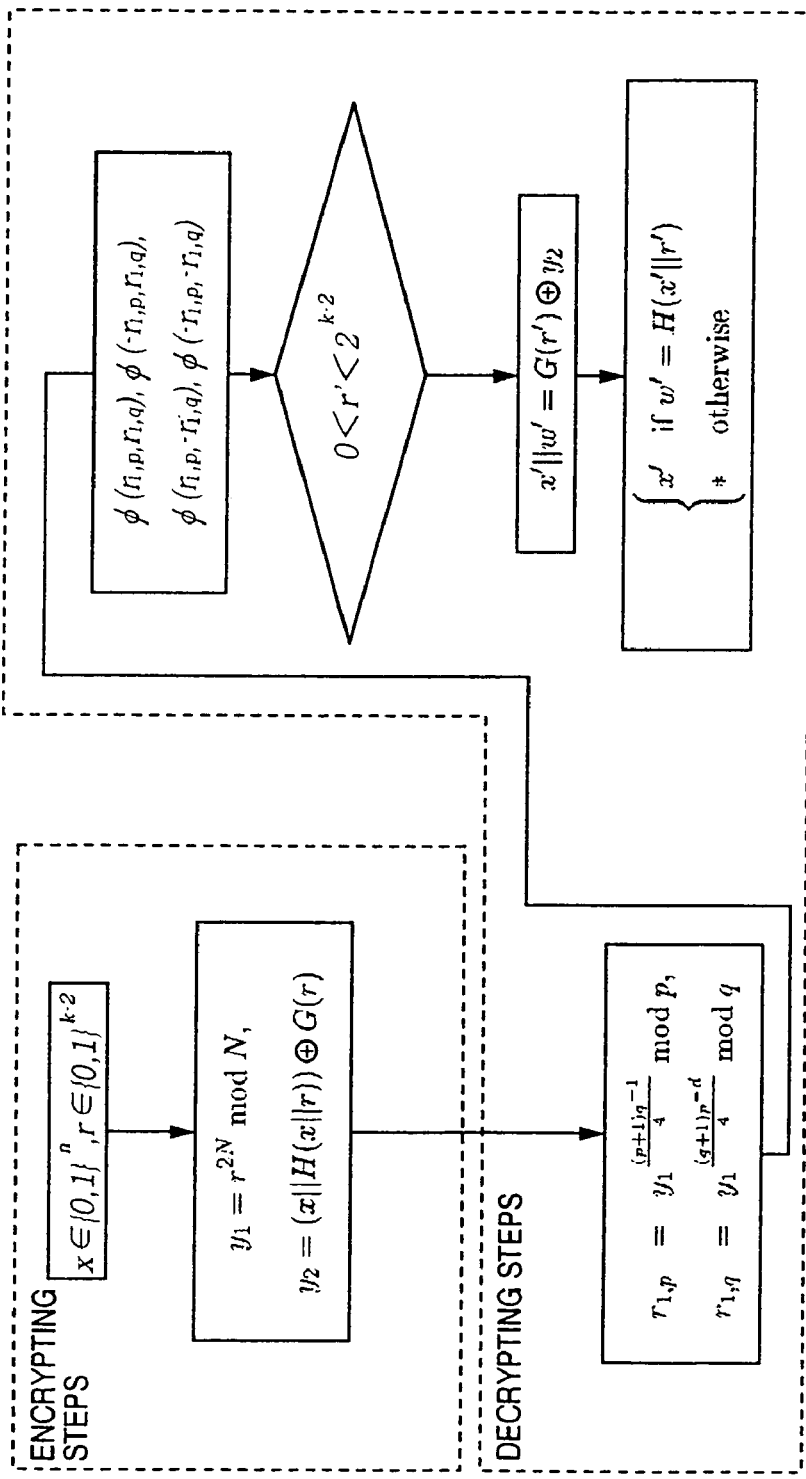
FIG. 15 is a diagram for illustrating the processing steps in a 19th embodiment.

In the present embodiment, the explanation will be given below regarding a modified example of the 17th embodiment. FIG. 15 is a diagram for illustrating the outline of the steps in the 19th embodiment.

1. Key Generation Processing

Using the key generation unit 201 in the receiver-side apparatus 200, the receiver creates, in advance, a secret key (p, q) given by p, q: prime numbers, $$p \equiv 3 (\bmod\ 4),\ q \equiv 3 (\bmod\ 4) \tag{125}$$

a public key (N, k, G, H) given by $N = p^d q$ ($d \geq 1$)

$k = |pq|$ $G: \{0,1\}^{k-2} \to \{0,1\}^{n+k_0}$ hash function, $$H: \{0,1\}^{n-k-2} \to \{0,1\}^{k_0}\ \text{hash function} \tag{126}$$

Also, the publication information is outputted via the communications line 300 or the like, then being sent to the sender-side apparatus 100 or being published. As the publishing method, the well-known method, e.g., the registration into the third party (i.e., the publication information management institution), is available. The other information is stored into the memory 205.

2. Encryption/Decryption Processing (1) Following the operation by the sender and using the random-number generation unit 101, the sender-side apparatus 100 selects a random number $r \in \{0, 1\}^{k-2}$ for a plaintext $x \in \{0, 1\}^n$ and, using the arithmetic-operation unit 103, the power multiplication unit 102, and the remainder arithmetic-operation unit 104, the sender-side apparatus calculates and defines, as the ciphertext, $$y_1 = r^{2N} \bmod N,\ y_2 = (x \| H(x \| r)) \oplus G(r), \tag{127}$$

Moreover, the sender-side apparatus, using the communications apparatus 106, transmits the ciphertext $(y_1, y_2)$ to the receiver-side apparatus 200 of the receiver via the communications line 300.

(2) Following the operation by the receiver and using the above-described secret information (p, q) and the power multiplication unit 202, the remainder arithmetic-operation unit 203, and the arithmetic-operation unit 204, the receiver-side apparatus 200 calculates, from the ciphertext $(y_1, y_2)$, $$r_{1,p} = y_1^{\frac{(p+1)q-1}{4}} \bmod p, \qquad (128)$$

$$r_{1,q} = y_1^{\frac{(q+1)p-d}{4}} \bmod q$$

and, of expressions $\phi(r_{1,p}, r_{1,q})$ $\phi(-r_{1,p}, r_{1,q})$, $\phi(r_{1,p}, -r_{1,q})$, and $\phi(-r_{1,p}, -r_{1,q})$, the apparatus sets an expression satisfying $0 < r' < 2^{k-2}$ to be r' (where, $\phi$ designates a ring isomorphism mapping from $Z/(p) \times Z/(q)$ to $Z/(pq)$ by the Chinese remainder theorem, and more than one r' may exist). Moreover, the apparatus calculates $$x'\|w' = G(r') \oplus y_2 \qquad (129)$$

(where, $x' \in \{0, 1\}^n$, $w' \in \{0, 1\}^{k0}$) and, based on $$\begin{cases} x' & \text{if } w' = H(x' \| r') \\ * & \text{otherwise} \end{cases} \qquad (130)$$

decrypts the ciphertext, thereby obtaining the plaintext (Here, it is stipulated that, in the case where x'=*, the receiver-side apparatus 200 denies the decryption of the ciphertext, and informs the operator of a notice to the effect).

Also, the secret key (p, q) can also be created from prime numbers p', q', using p=2p'+1, q=2q'+1.

In the public-key encryption method in the present embodiment, the value of d (d≧1) is set to be variable. Based on this condition, in the case where the bit length of the plaintext always remains short, the value of d is increased in a range where the unique factorization of n into its prime factors is difficult. This increase allows the decryption processing to be executed at a high-speed.

It can be demonstrated that, in the case of, e.g., d=3, the complete cryptanalysis of the method according to the present embodiment is impossible on the premise of the difficulty in the unique factorization problem of n. Namely, if there exists an algorithm for solving the unique factorization problem of n, the utilization of the algorithm makes it possible to configure an algorithm for executing the complete cryptanalysis of the method according to the present embodiment. Also, if there exists the algorithm for executing the complete cryptanalysis of the method according to the present embodiment, the utilization of the algorithm makes it possible to configure the algorithm for solving the unique factorization problem of n.

20th Embodiment

In the present embodiment, the explanation will be given below regarding a modified example of the 4th embodiment.

1. Key Generation Processing

Using the key generation unit 201 in the receiver-side apparatus 200, the receiver creates, in advance, a secret key $p_i$ ($1 \leq i \leq d$) given by $p_i$: prime numbers $$p_i \equiv 3 \pmod 4 \ (1 \leq i \leq d, \ d > 1) \qquad (131)$$

and a public key (N, k, G, H) given by $N = \prod_{i=1}^{d} p_i$ $k = |pq|$ $G: \{0,1\}^{k0} \to \{0,1\}^n$ hash function, $H_1: \{0,1\}^{n+k0} \to \{0,1\}^{k0}$ hash function $H_2: \{0,1\}^{n+k0} \to \{0,1\}^{k1}$ hash function $\qquad (132)$ Also, the publication-information is outputted via the communications line 300 or the like, then being sent to the sender-side apparatus 100 or being published. As the publishing method, the well-known method, e.g., the registration into the third party (i.e., the publication information management institution), is available. The other information is stored into the memory 205.

2. Encryption/Decryption Processing (1) Following the operation by the sender and using the random-number generation unit 101, the sender-side apparatus 100 selects a random number $r \in \{0, 1)\}^{k0}$ for a plaintext $x \in \{0, 1\}^n$ and, using the arithmetic-operation unit 103, the power multiplication unit 102, and the remainder arithmetic-operation unit 104, the sender-side apparatus calculates $$s = (x \oplus G(r)) \| H_2(x\|r), \ t = H_1(s) \oplus r; \qquad (133)$$

(where, $n + k_0 + k_1 \leq \log_2(N+1)$), and further, defines $$y_1 = s^2 \bmod N, \qquad (134)$$

as the ciphertext. Moreover, the sender-side apparatus, using the communications apparatus 106, transmits the ciphertext $(y_1, y_2)$ to the receiver-side apparatus 200 of the receiver via the communications line 300.

(2) Following the operation by the receiver and using the above-described secret information (p, q) and the power multiplication unit 202, the remainder arithmetic-operation unit 203, and the arithmetic-operation unit 204, the receiver-side apparatus 200 calculates, from the ciphertext $(y_1, y_2)$, $$x_{1,p_i} = y_1^{\frac{(p_i+1)}{4}} \bmod p_i \quad (1 \leq i \leq d) \qquad (135)$$

and, of $2^d$ expressions $\phi(\pm x_{1,p1}, \pm x_{1,p2}, \ldots, \pm x_{1,pd})$, the apparatus sets an expression satisfying $0 < w' < N/2$ to be w' (Here, $\phi$ designates a ring isomorphism mapping from $Z/(p_1) \times Z/(p_2) \times \ldots \times Z/(p_d)$ to $Z/(N)$ by the Chinese remainder theorem. Also, more than one w' may exist). Moreover, for $w' = s_1'\|s_2'\|'$ ($s_1' \in \{0, 1\}^n$, $s_2' \in \{0, 1\}^{k1}$, $t' \in \{0, 1\}^{k0}$), the apparatus calculates $$r' = H_1(s_1'\|s_2') \oplus t', \ x' = s_1' \oplus G(r') \qquad (136)$$

and, based on $$\begin{cases} x' & \text{if } s_2' = H_2(x' \| r') \\ * & \text{otherwise} \end{cases} \qquad (137)$$

decrypts the ciphertext, thereby-obtaining the plaintext (Here, it is stipulated that, in the case where x'=*, the receiver-side apparatus 200 denies the decryption of the ciphertext, and informs the operator of a notice to the effect).

Also, the secret key p, q can also be created from prime numbers p', q', using p=2p'+1, q=2q'+1.

In the public-key encryption method in the present embodiment, the value of d (d>1) is set to be variable.

It can be demonstrated that the complete cryptanalysis of the method according to the present embodiment is impossible on the premise of the difficulty in the unique factorization problem of n. Namely, if there exists an algorithm for solving the unique factorization problem of n, the utilization of the algorithm makes it possible to configure an algorithm for executing the complete cryptanalysis of the method according to the present embodiment. Also, if there exists the algorithm for executing the complete cryptanalysis of the method according to the present embodiment, the utilization of the algorithm makes it possible to configure the algorithm for solving the unique factorization problem of n.

As described above, in the present embodiment, the explanation has been given in the general scheme where the sender and the receiver perform the cipher communications with the use of the apparatuses of their own. Concretely, however, the method in the embodiment is applicable to various types of systems.

For example, in the electronic on-line shopping system, it turns out that the sender is a user, the sender-side apparatus is a computer such as a personal computer, the receiver is a retail shop, and the receiver-side apparatus is a computer such as a personal computer. At this time, in many cases, an order-form by the user concerning a commodity or the like is encrypted using a common-key cypher. The encryption key at that time is encrypted by the method according to the present embodiment, then being transmitted to the retail-shop-side apparatus.

Also, in the electronic mail system, the apparatuses of their own are computers such as personal computers and, in many cases, a transmission text (i.e., a mail) is encrypted using a common-key cypher. In that case, the common key is encrypted by the method according to the present embodiment, then being transmitted to the computer of the receiver.

In addition to the above-described various types of systems, the method in the present embodiment is also applicable to a variety of systems where the conventional public key encryption schemes have been used.

Although the respective calculations in the present embodiment have been explained on the assumption that the CPUs execute the respective programs stored in the memories, the following configuration is also allowable: The calculations are not entirely dependent on the programs, and instead, any one of the programs is replaced by an into-hardware-formed arithmetic-operation apparatus that performs data exchange with the other arithmetic-operation apparatuses and the CPUs. The application examples described herein are also in common in modified examples and 21st and 22nd embodiments that will be explained next.

Moreover, as a modified example of the public-key encryption method, the explanation will be given below concerning the following processing steps: At first, as the steps of the key generation, a secret key (p, q) given by p, q: prime numbers $$p \equiv 3 \pmod 4, q \equiv 3 \pmod 4 \tag{138}$$

is created, and further, a public key (N, k) given by $N = p^d q$ (d is odd number)

$$k = |pq| \tag{139}$$

is created, and (1) the sender defines, for a plaintext x ($x \in \{0, 1\}^{k-2}$), $$y_1 = x^{2N} \bmod N, \quad y_2 = \left(\frac{x}{N}\right) \tag{140}$$

as the ciphertext so as to transmit the ciphertext to the receiver-side apparatus 200 (where, a=(m/N) designates the Jacobi symbol), and (2) using the secret key (p, q) of the receiver, the receiver-side apparatus 200 calculates, from the ciphertext, $$x_{1,p} = y_1^{\frac{(p+1)q-1}{4}} \bmod p,$$

$$x_{1,q} = y_1^{\frac{(q+1)p-d}{4}} \bmod q \tag{141}$$

and, of expressions $\phi(x_{1,p}, x_{1,q})$, $\phi(-x_{1,p}, x_{1,q})$, $\phi(x_{1,p}, -x_{1,q})$, and $\phi(-x_{1,p}, -x_{1,q})$, the apparatus defines, as the decryption result, an expression satisfying $(x/N) = y_3$ and $0 < x < 2^{k-2}$ (where, $\phi$ designates a ring isomorphism mapping from $Z/(p) \times Z/(q)$ to $Z/(pq)$ by the Chinese remainder theorem).

Furthermore, as another modified example of the public-key encryption method, the explanation will be given below regarding the following another processing steps:

At first, as the steps of the key generation, a secret key $p_i$ ($1 \leq i \leq d$) given by $p_i$: prime numbers $$p_i \equiv 3 \pmod 4 \ (1 \leq i \leq d, d > 1) \tag{142}$$

is created, and further, a public key (N, k) given by $N = \Pi_{i=1}^d p_i$ $$k = |N| \tag{143}$$

is created, and (1) the sender defines, for a plaintext x ($x \in \{0, 1\}^k$), $$y_1 = x^2 \bmod N, \tag{144}$$

as the ciphertext so as to transmit the ciphertext to the receiver-side apparatus 200, and (2) using the secret key $p_i$ of the receiver, the receiver-side apparatus 200 calculates, from the ciphertext, $$x_{1,p_i} = y_1^{\frac{(p_i+1)}{4}} \bmod p_i \ (1 \leq i \leq d) \tag{145}$$

and, of $2^d$ expressions $\phi(\pm x_{1,p1}, \pm x_{1,p2}, \ldots, \pm x_{1,pd})$, the apparatus decrypts the ciphertext from an expression satisfying $0 < x' < N/2$ (Here, $\phi$ designates a ring isomorphism mapping from $Z/(p_1) \times Z/(p_2) \times \ldots \times Z/(p_d)$ to $Z/(N)$ by the Chinese remainder theorem. Also, more than one x' may exist), thereby securing the decryption's uniqueness.

21st Embodiment

Figure 16:
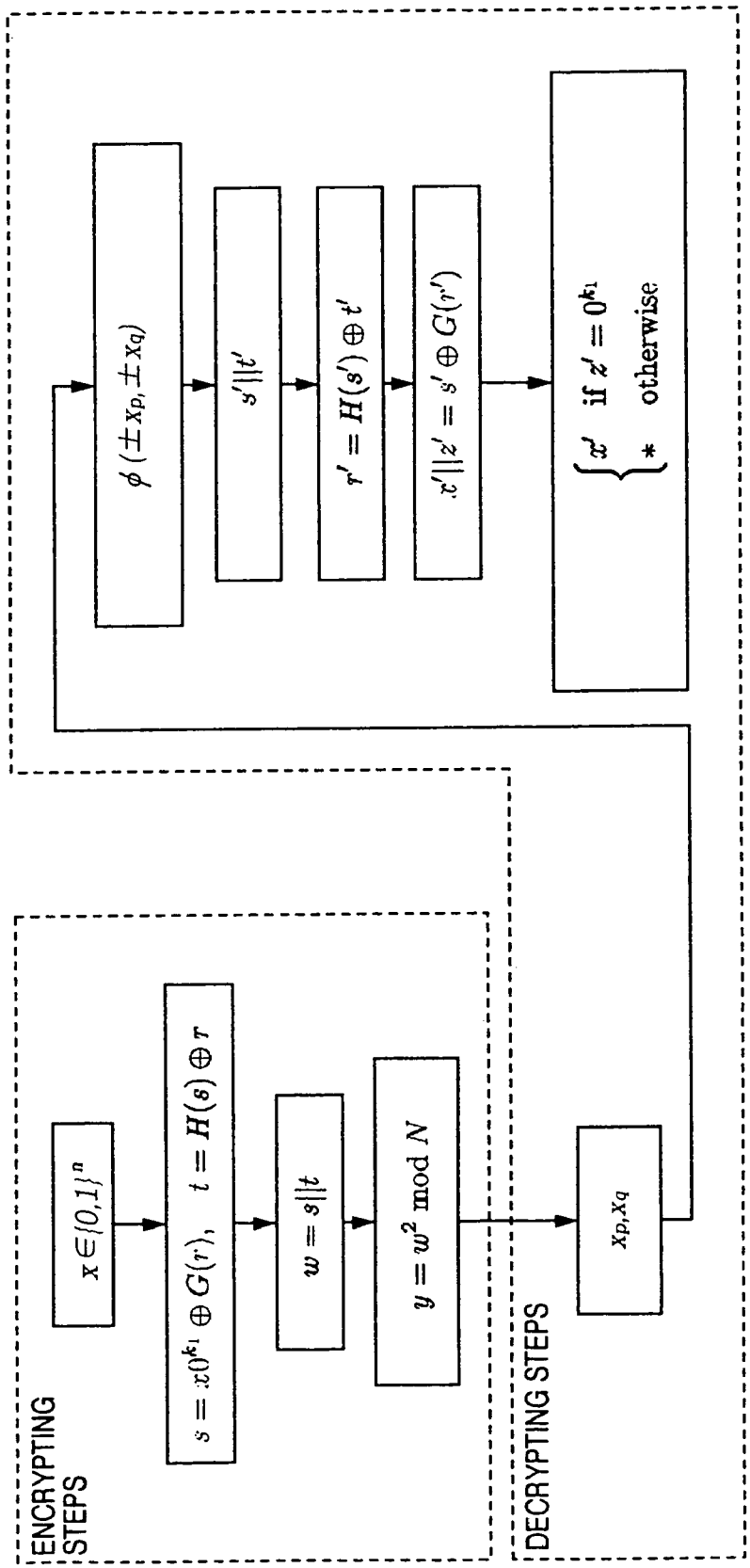
FIG. 16 is a diagram for illustrating the processing steps in a 21st embodiment.

In the present embodiment, the explanation will be given below concerning the case where, via a cipher communication, the sender of a plaintext (which is also referred to as "message") transmits, to the receiver, the message becoming the transmission data. FIG. 16 is a diagram for illustrating the processing steps in the 21st embodiment.

1. Key Generation Processing

Using the key generation unit 201 in the receiver-side apparatus 200, the receiver creates, in advance, (a) a secret key (p, q) given by an expression (146):

p, q: prime numbers $$p \equiv 3 \pmod 4, q \equiv 3 \pmod 4 \quad (146)$$

and further, creates (b) a public key (N, k, G, H) given by an expression (147):

$N = p^d q$ (d is odd number)

$k = |N|$ $G: \{0,1\}^{k_0} \to \{0,1\}^{n+k_1}$ hash function, $H: \{0,1\}^{n+k_1} \to \{0,1\}^{k_0}$ hash function (147)

and (I) the sender-side apparatus selects a random number $r \in \{0,1\}^{k_0}$ for a plaintext x ($x \in \{0,1\}^n$), and (c) calculates an expression (148):

$s = x 0^{k_1} \oplus G(r)$, $t = H(s) \oplus r$, (148)

(where, $n + k_0 + k_1 = k$), and further, (d) calculates an expression (149):

$w = s \| t$, (149)

and (e) calculates an expression (150):

$y = w^2 \bmod N$ (150)

and defines this result y as the ciphertext so as to transmit the ciphertext to the receiver-side apparatus, and (II) the receiver-side apparatus, using the secret key (p, q) of itself, (f) calculates, from the ciphertext y, an expression (151):

$$\alpha_0 = y^{\frac{p+1}{4}} \bmod p, \quad (151)$$

$$\beta_0 = \alpha_0,$$

$$\alpha_k = \frac{1}{2\beta_{k-1}} \left( \frac{y \bmod p^{k+1} - \beta_{k-1}^2}{p^k} \right) \bmod p, \ (k \geq 1)$$

$$\beta_k = \sum_{i=0}^{k} \alpha_i p^i \ (k \geq 1),$$

and, using this result, (g) calculates an expression (152)

$$x_p = \sum_{i=0}^{d-1} \alpha_i p^i \quad (152)$$

and further, (h) calculates an expression (153):

$$x_q = y^{\frac{q+1}{4}} \bmod q \quad (153)$$

and, concerning each of expressions $\phi(x_p, x_q)$, $\phi(-x_p, x_q)$, $\phi(x_p, -x_q)$, and $\phi(-x_p, -x_q)$ (where, $\phi$ designates a ring isomorphism mapping from $Z/(p) \times Z/(q)$ to $Z/(pq)$ by the Chinese remainder theorem), (i) sets each of the expressions to be as given by an expression (154):

$s' \| t'$ ($s' \in \{0,1\}^{n+k_1}$, $t' \in \{0,1\}^{k_0}$) (154)

and (j) calculates an expression (155):

$r' = H(s') \oplus t'$, $x' \| z' = s' \oplus G(r')$ ($x' \in \{0,1\}^n$, $z' \in \{0,1\}^{k_1}$) (155)

and (k) obtains the decryption result given by an expression (156):

$$\begin{cases} x' & \text{if } z' = 0^{k_j} \\ * & \text{otherwise} \end{cases} \quad (156)$$

(Here, it is stipulated that, in the case where the decryption result is * (or invalid), the receiver-side apparatus denies the above-described ciphertext).

The secret key (p, q) can also be created from prime numbers p', q', using p=2p'+1, q=2q'+1.

In the public-key encryption method in the present embodiment, the value of d (d≧1) can be modified. For example, in the case where the bit length of the plaintext always remains short, the value of d is increased in a range where the unique factorization of n into its prime factors is difficult. This increase allows the decryption processing to be executed at a high-speed.

The public-key encryption method according to the present embodiment can be proved to be semantically-secure against the chosen-ciphertext attack on the premise of the difficulty in the unique factorization problem of N. The outline of the proof is as follows:

Assuming that there should exist an algorithm that is capable of breaking the public-key encryption method according to the present embodiment (in the meaning of the semantical-security in the adaptive chosen-ciphertext attack, and the definition thereof has been described in, e.g., the literature 14), the use of the algorithm allows the construction of an algorithm for executing the unique factorization of N into its prime factors. This makes it possible to prove that the public-key encryption method in the present embodiment is IND-CCA2 on the premise of the difficulty in the unique factorization problem.

In the present embodiment, information indicating a large-or-small relationship between the value of w and that of N/2, e.g., −1 or 1 when the value of w is smaller or larger than that of N/2, respectively, may be published by the sender-side apparatus 100 or may be transmitted to the receiver-side apparatus 200 by the sender-side apparatus. The receiver-side apparatus 200 uses the above-described information in the decryption processing, thereby making it possible to limit the 4 expressions, i.e., $\phi(x_p, x_q)$, $\phi(-x_p, x_q)$, $\phi(x_p, -x_q)$ and $\phi(-x_p, -x_q)$ into 2 expressions. When d is an odd number, the sender-side apparatus publishes the Jacobi symbol (i.e., w/N) or transmits the Jacobi symbol to the receiver-side apparatus, thereby calculating the values of the Jacobi symbols for $\phi(x_p, x_q)$, $\phi(-x_p, x_q)$, $\phi(x_p, -x_q)$, and $\phi(-x_p, -x_q)$. This also makes it possible to limit the 4 expressions into 2 expressions. These devices permit the efficiency to be enhanced in the decryption processing.

The definition and the calculating method of the Jacobi symbol have been described in, e.g., the literature 16: "A. J. Menezes, P. C. van Oorschot, S. A. Vanstone: Jacobi Symbol: Definition & Algorithm, Handbook of Applied Cryptography, CRC Press, pp. 73, (1996)", or the literature 17: "H. Cohen: Jacobi Symbol: Definition & Algorithm, A Course in Computational Algebraic Number Theory, Graduate Texts in Math. 138, Springer-Verlag, New York, pp. 27-31, (1993)".

The public-key encryption method according to the present embodiment is also usable simultaneously with a common-key cypher with the objective of distributing the data encryption key in the common-key cypher.

In the present embodiment, the method of calculating the expressions $\phi(x_{1,p}, x_{1,q})$, $\phi(-x_{1,p}, x_{1,q})$, $\phi(x_{1,p}, -x_{1,q})$ and $\phi(-x_{1,p}, -x_{1,q})$ from the ciphertext y also provides a high-speed calculation method of determining a square root with $N=p^d q$ as the modulus. This calculation method is applicable to another system for performing a calculation of determining a square root (or an m-th power root) with $N=p^d q$ as the modulus, thereby allowing the system to execute a high-speed calculation of the power root.

22nd Embodiment

Figure 17:
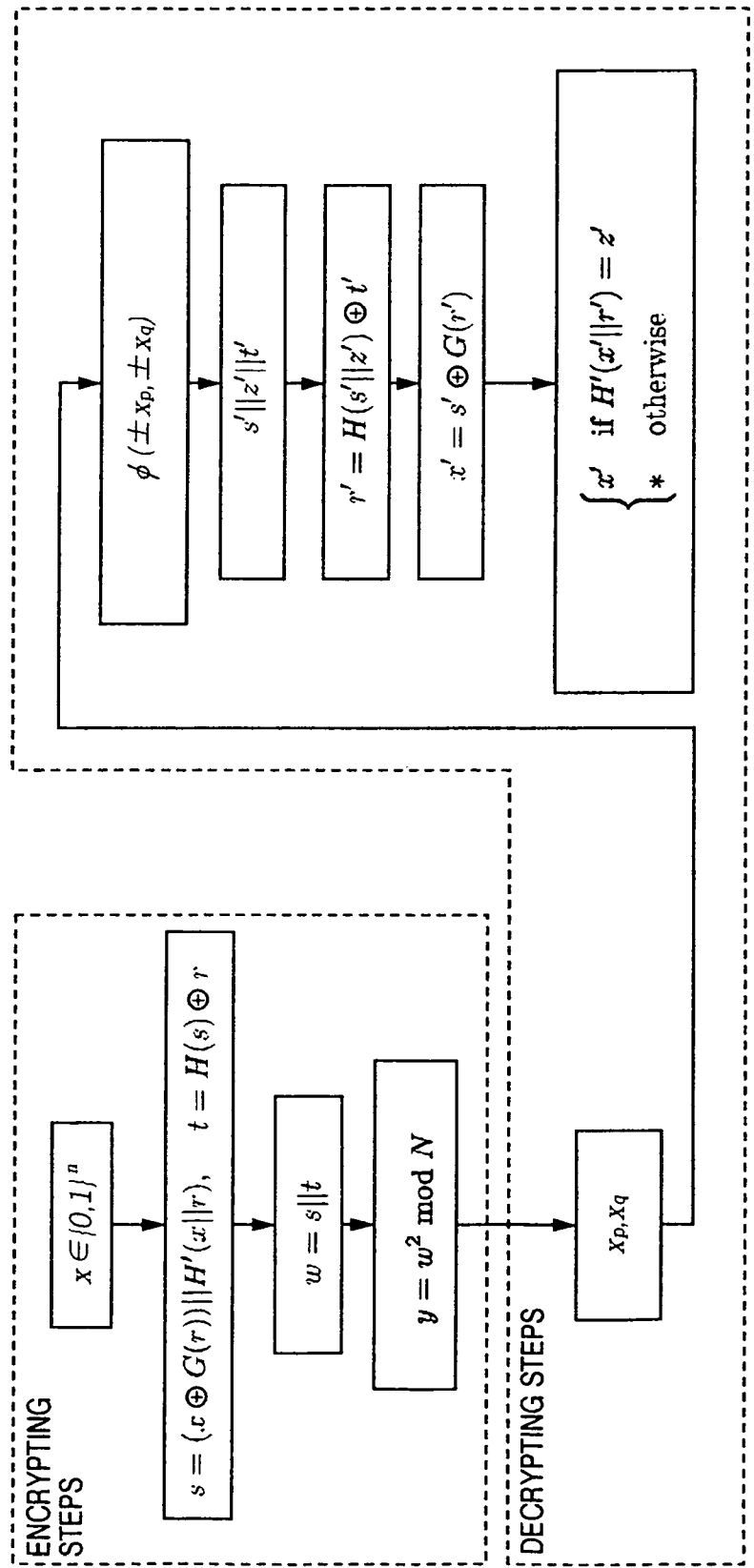
FIG. 17 is a diagram for illustrating the processing steps in a 22nd embodiment.

In the present embodiment, there is provided a modified example of the 21st embodiment. FIG. 17 is a diagram for illustrating the processing steps in the 22nd embodiment.

1. Key Generation Processing

Using the key generation unit 201 in the receiver-side apparatus 200, the receiver-side apparatus 200 creates, in advance, a secret key (p, q) given by an expression (157), and creates a public key (N, k, G, H) given by an expression (158). Here, it is stipulated that the manager of the present system or the receiver-side apparatus has determined the value of d in advance or as required, and that the above-described key generation unit fetches the value.

The publication information is sent to the sender-side apparatus 100 or is published via the communications line 300 or the like. As the publishing method, the well-known method, e.g., the registration into the third party (i.e., the publication information management institution), is available. The other information is stored into the memory 205.

2. Encryption/Decryption Processing (1) Following the operation by the sender and using the random-number generation unit 101, the sender-side apparatus 100 selects a random number $r \in \{0, 1\}^{k0}$ for a plaintext $x \in \{0, 1\}^n$ and, using the arithmetic-operation unit 103, the power multiplication unit 102, and the remainder arithmetic-operation unit 104, the sender-side apparatus creates (a) the secret key (p, q) given by an expression (157):

p, q: prime numbers, $$p \equiv 3 \pmod 4, q \equiv 3 \pmod 4 \quad (157)$$

and further, creates (b) the public key (N, k, G, H) given by an expression (158):

$N = p^d q$ (d is odd number)

$k = |pq|$ $G: \{0,1\}^{k0} \rightarrow \{0,1\}^n$ hash function, $H: \{0,1\}^{n+k1} \rightarrow \{0,1\}^{k0}$ hash function $$H': \{0,1\}^{n+k0} \rightarrow \{0,1\}^{k1} \text{ hash function} \quad (158)$$

and (I) the sender-side apparatus selects the random number $r \in \{0, 1\}^{k0}$ for the plaintext x ($x \in \{0, 1\}^n$), and (c) calculates an expression (159):

$s = (x \oplus G(r)) \| H'(x\|r)$, $$t = H(s) \oplus r, \quad (159)$$

(where, $n + k_0 + k_1 = k$), and further, (d) calculates an expression (160):

$$w = s\|t, \quad (160)$$

and (e) calculates an expression (161):

$$y = w^2 \bmod N \quad (161)$$

and defines this result y as the ciphertext so as to transmit the ciphertext to the receiver-side apparatus 200, and (II) the receiver-side apparatus 200, using the secret key (p, q) of itself, (f) calculates, from the ciphertext, an expression (162):

$$\alpha_0 = y^{\frac{p+1}{4}} \bmod p, \quad (162)$$

$\beta_0 = \alpha_0$, $\alpha_k = \frac{1}{2\beta_{k-1}} \left( \frac{y \bmod p^{k+1} - \beta_{k-1}^2}{p^k} \right) \bmod p$, $\beta_k = \sum_{i=0}^{k} \alpha_i p^i \ (k \geq 1)$, and, using this result, (g) calculates an expression (163):

$$x_p = \sum_{i=0}^{d-1} \alpha_i p^i \quad (163)$$

and further, (h) calculates an expression (164):

$$x_q = y^{\frac{q+1}{4}} \bmod q \qquad (164)$$

and, concerning each of expressions $\phi(x_p, x_q)$, $\phi(-x_p, x_q)$, $\phi(x_p, -x_q)$, and $\phi(-x_p, -x_q)$ (where, $\phi$ designates a ring isomorphism mapping from $Z/(p) \times Z/(q)$ to $Z/(pq)$ by the Chinese remainder theorem), (i) sets each of the expressions to be as given by an expression (165):

$$s'\|z'\|t' \ (s' \in \{0,1\}^n, z' \in \{0,1\}^{k_1}, t' \in \{0,1\}^{k_0}) \qquad (165)$$

and (j) calculates an expression (166):

$$r' = H(s'\|z') \oplus t',$$

$$x' = s' \oplus G(r') \ (x' \in \{0,1\}^n) \qquad (166)$$

and (k) obtains the decryption result given by an expression (167):

$$\begin{cases} x' & \text{if } H'(x'\|r') = z' \\ * & \text{otherwise} \end{cases} \qquad (167)$$

(Here, it is stipulated that, in the case where the decryption result is *, the receiver-side apparatus denies the above-described ciphertext).

Also, the secret key (p, q) can also be created from prime numbers p', q', using p=2p'+1, q=2q'+1.

In the public-key encryption method in the present embodiment, the value of d (d≧1) can be modified. For example, in the case where the bit length of the plaintext always remains short, the value of d is increased in a range where the unique factorization of n into its prime factors is difficult. This increase allows the decryption processing to be executed at a high-speed.

As is the case with the 21st embodiment, the method according to the present embodiment can be proved to be IND-CCA2 on the premise of the difficulty in the unique factorization problem of N.

As is the case with the 21st embodiment, with the objective of limiting the expressions, i.e., $\phi(x_p, x_q)$, $\phi(-x_p, x_q)$, $\phi(x_p, -x_q)$, and $\phi(-x_p, -x_q)$ in the decryption processing, it is also possible to publish or transmit the values of the Jacobi symbols (w/N), or to publish or transmit the information indicating the large-or-small relationship between the value of w and that of N/2.

The public-key encryption method according to the present embodiment is also usable simultaneously with a common-key cypher with the objective of distributing the data encryption key in the common-key cypher.

It will be further understood by those skilled in the art that the foregoing description has been made on embodiments of the invention and that various changes and modifications may be made in the invention without departing from the spirit of the invention and scope of the appended claims.

What is claimed is:

1. A receiver-side apparatus for decrypting transmission data, said receiver-side apparatus comprising:
   a key generation unit; and
   a decryption unit,
   wherein the key generation unit:
   (a): creates a secret key given by an expression:

p, q: prime numbers $p \equiv 3 \pmod 4$, $q \equiv 3 \pmod 4$ and further,
(b) creates a public key given by an expression:

$N = p^d q$ (d is odd number)

$k = |N|$ $G: \{0,1\}^{k_0} \rightarrow \{0,1\}^{n+k_1}$ hash function, $H: \{0,1\}^{n+k_1} \rightarrow \{0,1\}^{k_0}$ hash function wherein a sender-side apparatus calculates an expression:

$y = w^2 \bmod N$ and defines this result y as a ciphertext so as to transmit said ciphertext to the receiver-side apparatus,
wherein said decryption unit, using said secret key:
(c) calculates, from said ciphertext y, an expression:

$$\alpha_0 = y^{\frac{p+1}{4}} \bmod p,$$

$$\beta_0 = \alpha_0,$$

$$\alpha_k = \frac{1}{2\beta_{k-1}} \left( \frac{y \bmod p^{k+1} - \beta_{k-1}^2}{p^k} \right) \bmod p, \ (k \geq 1)$$

$$\beta_k = \sum_{i=0}^{k} \alpha_i p^i \ (k \geq 1),$$

and, using this result,
(d) calculates an expression:

$$x_p = \sum_{i=0}^{d-1} \alpha_i p^i$$

and further,
(e) calculates an expression:

$$x_q = y^{\frac{q+1}{4}} \bmod q$$

and, concerning each of expressions $\phi(x_p, x_q)$, $\phi(-x_p, x_q)$, $\phi(x_p, -x_q)$, and $\phi(-x_p, -x_q)$ (where, $\phi$ designates a ring isomorphism mapping from $Z/(p) \times Z/(q)$ to $Z/(pq)$ by Chinese remainder theorem),
(f) sets each of said expressions to be as given by an expression:

$s'\|t' \ (s' \in \{0,1\}^{n+k_1}, t' \in \{0,1\}^{k_0})$ and
(g) calculates an expression:

$r' = H(s') \oplus t',$ $x'\|z' = s' \oplus G(r') \ (x' \in \{0,1\}^n, z' \in \{0,1\}^{k_1})$ and
(h) obtains a decryption result given by an expression:

$$\begin{cases} x' & \text{if } z' = 0^{k_1} \\ * & \text{otherwise} \end{cases}$$

wherein, it is stipulated that, in a case where said decryption result is * or invalid, said receiver-side apparatus denies said ciphertext,
wherein p and q are prime numbers, wherein (N, k, G, H) represents a public key, and each of N, k, G, and H represent a function of the public key,
wherein n is a natural number,
wherein r is a random number,
wherein Z represents an aggregate of integers, and
wherein d is an integer.

2. The receiver-side apparatus according to claim 1, wherein said receiver-side apparatus generates and publishes publication information.

3. The receiver-side apparatus according to claim 1, wherein said sender-side apparatus publishes or transmits a Jacobi symbol (w/N), said sender-side apparatus also publishing information or transmitting said information to said receiver-side apparatus, said information indicating a large-or-small relationship between a value of w and that of N/2.

4. The receiver-side apparatus according to claim 1, wherein, as said prime numbers constituting said secret key, prime numbers of a form of 2p'+1 are selected with respect to another prime numbers p'.

5. The receiver-side apparatus according to claim 1, wherein a value of d (d≧1) is set to be variable.

6. A receiver-side apparatus for decrypting transmission data, said receiver-side apparatus comprising:
   a key generation unit; and
   a decryption unit,
   wherein the key generation unit:
   (a) creates a secret key given by an expression:

p, q: prime numbers $p \equiv 3 \pmod 4$, $q \equiv 3 \pmod 4$ and further,
   (b) creates a public key given by an expression:

$N = p^d q$ (d is odd number)

$k = |N|$ $G: \{0,1\}^{k_0} \to \{0,1\}^n$ hash function, $H: \{0,1\}^{n+k_1} \to \{0,1\}^{k_0}$ hash function $H': \{0,1\}^{n+k_0} \to \{0,1\}^{k_1}$ hash function wherein a sender-side apparatus calculates an expression:
   $y = w^2 \bmod N$ and defines this result y as a ciphertext so as to transmit said ciphertext to the receiver-side apparatus,
   wherein said decryption unit, using said secret key:
   (c) calculates, from said ciphertext y, an expression:

$$\alpha_0 = y^{\frac{p+1}{4}} \bmod p,$$
   $$\beta_0 = \alpha_0,$$
   $$\alpha_k = \frac{1}{2\beta_{k-1}}\left(\frac{y \bmod p^{k+1} - \beta_{k-1}^2}{p^k}\right) \bmod p,$$

$$\beta_k = \sum_{i=0}^{k} \alpha_i p^i \quad (k \geq 1),$$

and using this result,
   (d) calculates an expression:

$$x_p = \sum_{i=0}^{d-1} \alpha_i p^i$$

and further,
   (e) calculates an expression:

$$x_q = y^{\frac{q+1}{4}} \bmod q$$

and, concerning each of expressions $\phi(x_p, x_q)$, $\phi(-x_p, x_q)$, $\phi(x_p, -x_q)$, and $\phi(-x_p, -x_q)$ where, $\phi$ designates a ring isomorphism mapping from $Z/(p) \times Z/(q)$ to $Z/(pq)$ by Chinese remainder theorem,
   (f) sets each of said expressions to be as given by an expression:

$s'\|z'\|t'$ $(s' \in \{0,1\}^n, z' \in \{0,1\}^{k_1}, t' \in \{0,1\}^{k_0}$ and
   (g) calculates an expression:

$r' = H(s'\|z') \oplus t'$, $x' = s' \oplus G(r')$ $(x' \in \{0,1\}^n)$ and
   (h) obtains a decryption result given by an expression:

$$\begin{cases} x' & \text{if } H'(x'\|r') = x' \\ * & \text{otherwise} \end{cases}$$

wherein, it is stipulated that, in a case where said decryption result is *, said receiver-side apparatus denies said ciphertext,
   wherein p and q are prime numbers,
   wherein (N, k, G, H) represents a public key, and each of N, k, G, and H represent a function of the public key,
   wherein n is a natural number,
   wherein r is a random number,
   wherein Z represents an aggregate of integers, and
   wherein d is an integer.

7. The receiver-side apparatus according to claim 6, wherein said receiver-side apparatus generates and publishes publication information.

* * * * *